United States Patent
Kwant et al.

(10) Patent No.: US 10,325,166 B2
(45) Date of Patent: Jun. 18, 2019

(54) METHOD, APPARATUS, AND SYSTEM FOR A PARAMETRIC REPRESENTATION OF SIGNS

(71) Applicant: HERE Global B.V., Eindhoven (NL)

(72) Inventors: Richard Kwant, Oakland, CA (US); Anish Mittal, Berkeley, CA (US); David Lawlor, Chicago, IL (US); Himaanshu Gupta, San Francisco, CA (US)

(73) Assignee: HERE Global B.V., Eindhoven (NL)

( * ) Notice: Subject to any disclaimer, the term of this patent is extended or adjusted under 35 U.S.C. 154(b) by 244 days.

(21) Appl. No.: 15/487,069

(22) Filed: Apr. 13, 2017

(65) Prior Publication Data
US 2018/0300564 A1    Oct. 18, 2018

(51) Int. Cl.
*G06K 9/00*   (2006.01)
*G06K 9/46*   (2006.01)
(Continued)

(52) U.S. Cl.
CPC ..... *G06K 9/00818* (2013.01); *B60W 30/0956* (2013.01); *B60W 40/04* (2013.01);
(Continued)

(58) Field of Classification Search
CPC .... G06K 9/00818; G06K 9/4604; G06K 9/48; G06K 9/4642; G06K 9/4652;
(Continued)

(56) References Cited

U.S. PATENT DOCUMENTS 5,621,645 A *  4/1997  Brady .................... G08G 1/04
                                                          340/903
6,266,442 B1    7/2001  Laumeyer et al.
(Continued)

FOREIGN PATENT DOCUMENTS

EP    1782335 B1    2/2009

OTHER PUBLICATIONS

Foulonneau et al., "Multi-Reference Shape Priors for Active Contours", International Journal of Computer Vision, Jan. 2009, pp. 68-81.
(Continued)

*Primary Examiner* — Jerome Grant, II
(74) *Attorney, Agent, or Firm* — Ditthavong & Steiner, P.C.

(57) ABSTRACT

An approach is provided for parametric representation of signs. The approach involves receiving a request to detect and encode signs depicted in an input image into a parametric representation. The approach also involves assigning processing nodes of a computer vision system to independently process each grid cell of the input image to detect at least one edge of a sign. The processing nodes are assigned based on proximity to each grid cell. Each respective grid cell is created by overlaying a grid onto the input image. The approach further involves encoding, by the processing nodes, an angle and a location of a detected edge as edge parameters of a cell-based parametric representation for each grid cell. The approach further involves aggregating the cell-based parametric representation for each respective grid cell in which at least one edge is detected to output the parametric representation of the at least one sign.

20 Claims, 19 Drawing Sheets

(51) Int. Cl.
*B60W 30/095* (2012.01)
*B60W 40/04* (2006.01)
*G06K 9/48* (2006.01)
*G06K 9/62* (2006.01)

(52) U.S. Cl.
CPC ......... *G06K 9/4604* (2013.01); *G06K 9/4642* (2013.01); *G06K 9/48* (2013.01); *B60W 2420/42* (2013.01); *B60W 2550/10* (2013.01); *B60W 2550/22* (2013.01); *G06K 9/4652* (2013.01); *G06K 9/6218* (2013.01)

(58) Field of Classification Search
CPC ............ G06K 9/6218; B60W 30/0956; B60W 40/04; B60W 2420/42; B60W 2550/22; B60W 2550/10
USPC ......................................................... 382/104
See application file for complete search history.

(56) References Cited

U.S. PATENT DOCUMENTS

| | | | | |
|---|---|---|---|---|
| 8,041,080 | B2 | 10/2011 | Porikli et al. | |
| 2006/0115001 | A1* | 6/2006 | Wang | H04N 19/105 375/240.24 |
| 2006/0164526 | A1* | 7/2006 | Suzuki | G06T 3/00 348/239 |
| 2011/0246027 | A1* | 10/2011 | Miyajima | G01C 21/3647 701/41 |
| 2013/0077830 | A1* | 3/2013 | Liu | G06K 9/00818 382/104 |
| 2015/0178584 | A1* | 6/2015 | Aller | G06K 9/3216 382/165 |
| 2017/0270668 | A1* | 9/2017 | Greenland | G06T 7/0014 |
| 2018/0300564 | A1* | 10/2018 | Kwant | G06K 9/00818 |

OTHER PUBLICATIONS

Schreier et al., "Compact Representation of Dynamic Driving Environments for ADAS by Parametric Free Space and Dynamic Object Maps", IEEE Transactions on Intelligent Transportation Systems, Feb. 2016, pp. 1-39.

Durrant-Whyte et al., "Simultaneous Localization and Mapping: Part I", IEEE Robotics & Automation Magazine, Jun. 2006, pp. 99-108.

Lowe, "Object Recognition from Local-Scale-Invariant Features", Proceedings of the International Conference on Computer Vision, Sep. 1999, pp. 1-8.

Gurghian et al., "DeepLanes: End-To-End Lane Position Estimation using Deep Neural Networks", IEEE Conference on Computer Vision and Pattern Recognition Workshops, Jun. 26-Jul. 1, 2016, pp. 38-45.

Huval et al., "An Empirical Evaluation of Deep Learning on Highway Driving", Apr. 17, 2015, pp. 1-7.

Redmon et al., "You Only Look Once: Unified, Real-Time Object Detection", May 9, 2016, pp. 1-10.

* cited by examiner

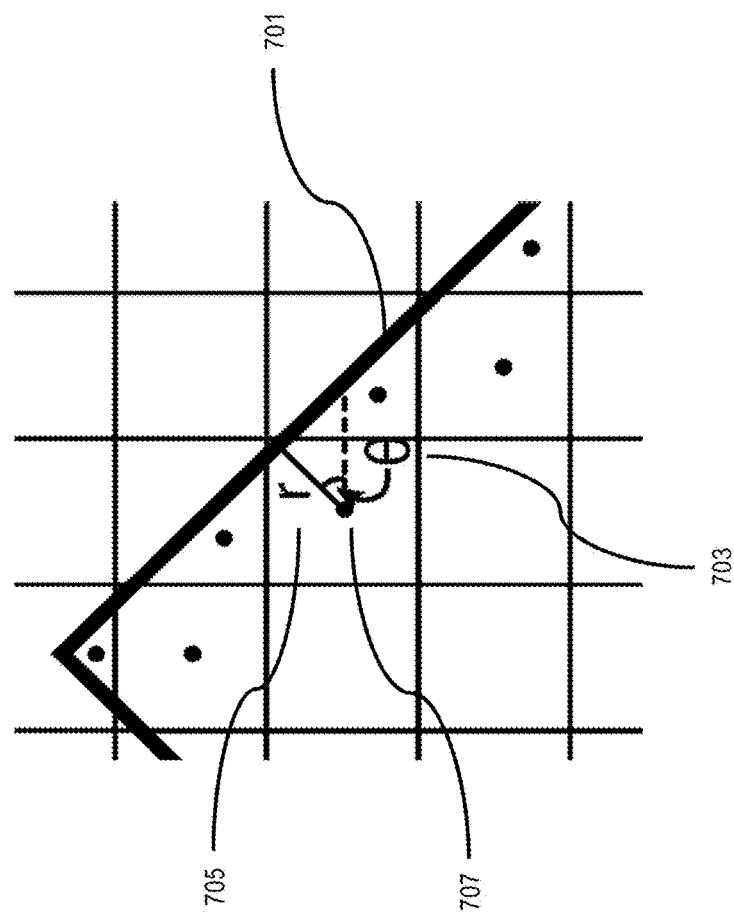

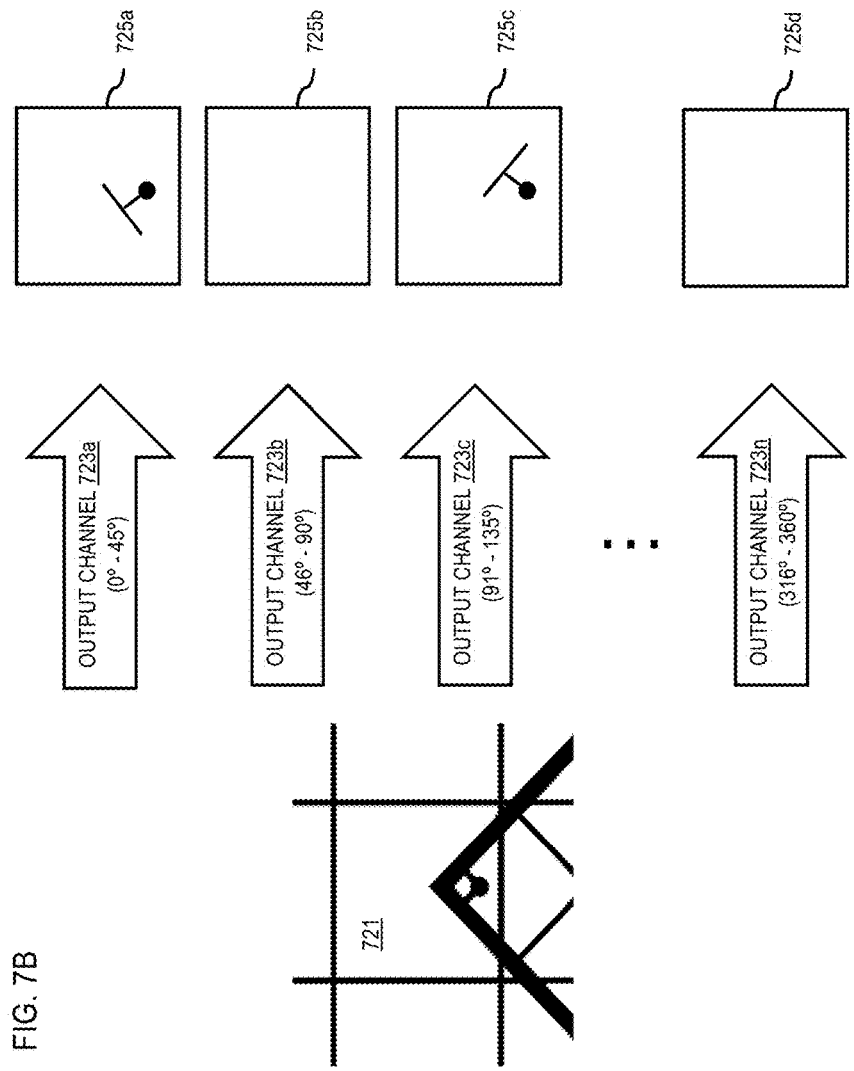

METHOD, APPARATUS, AND SYSTEM FOR A PARAMETRIC REPRESENTATION OF SIGNS

BACKGROUND

Autonomous driving has quickly become an area of interest for vehicle manufacturers and navigation and mapping service providers. One particular area of interest is the use of computer vision to enable mapping and sensing of a vehicle's environment to support autonomous or semi-autonomous operation. Advances in available computing power have enabled mapping and sensing to approach or achieve real-time operation through, for instance, machine learning (e.g., neural networks). As a result, one application of vision techniques in autonomous driving is providing information about the environment by detecting road signs and/or other signs near a travel route. In addition, vision techniques can also be used to localize the position of a vehicle with respect to known reference marks such as the aforementioned signs. However, despite the noted advances in available computing power, service providers and manufacturers still face significant technical challenges to enable computer vision systems to efficiently recognize and encode features of road signs, such as their edges, shapes, and/or other attributes. This is particularly challenging in computer vision systems that employ advanced neural networks or other similar machine learning systems that include multiple processing nodes.

SOME EXAMPLE EMBODIMENTS

Therefore, there is a need for an approach for generating a parametric representation of signs from captured images (e.g., a video capture stream from an autonomous vehicle) for use in advanced computer vision systems.

According to one embodiment, a method comprises receiving, by a computer vision system, a request to detect and encode at least one sign depicted in an input image into a parametric representation of the at least one sign. The method also comprises assigning respective one or more processing nodes of the computer vision system to independently process each respective grid cell of the input image to detect at least one edge of the at least one sign. Said processing nodes are assigned based on a proximity to said each respective grid cell, and said each respective grid cell is among a plurality of grid cells created by overlaying a grid onto the input image. The method further comprises encoding, by said respective processing nodes, an angle and a location of a detected at least one edge as edge parameters of a cell-based parametric representation for said each respective grid cell. The method further comprises aggregating the cell-based parametric representation for said each respective grid cell in which the at least one edge of the at least one sign is detected to output the parametric representation of the at least one sign.

According to another embodiment, an apparatus comprises at least one processor, and at least one memory including computer program code for one or more computer programs, the at least one memory and the computer program code configured to, with the at least one processor, cause, at least in part, the apparatus to receive, by a computer vision system, a request to detect and encode at least one sign depicted in an input image into a parametric representation of the at least one sign. The apparatus is also caused to assigning respective one or more processing nodes of the computer vision system to independently process each respective grid cell of the input image to detect at least one edge of the at least one sign. Said processing nodes are assigned based on a proximity to said each respective grid cell, and said each respective grid cell is among a plurality of grid cells created by overlaying a grid onto the input image. The apparatus is further caused to encoding, by said respective processing nodes, an angle and a location of a detected at least one edge as edge parameters of a cell-based parametric representation for said each respective grid cell. The apparatus is further caused to aggregate the cell-based parametric representation for said each respective grid cell in which the at least one edge of the at least one sign is detected to output the parametric representation of the at least one sign.

According to another embodiment, a non-transitory computer-readable storage medium carries one or more sequences of one or more instructions which, when executed by one or more processors, cause, at least in part, an apparatus to receive, by a computer vision system, a request to detect and encode at least one sign depicted in an input image into a parametric representation of the at least one sign. The apparatus is also caused to assigning respective one or more processing nodes of the computer vision system to independently process each respective grid cell of the input image to detect at least one edge of the at least one sign. Said processing nodes are assigned based on a proximity to said each respective grid cell, and said each respective grid cell is among a plurality of grid cells created by overlaying a grid onto the input image. The apparatus is further caused to encoding, by said respective processing nodes, an angle and a location of a detected at least one edge as edge parameters of a cell-based parametric representation for said each respective grid cell. The apparatus is further caused to aggregate the cell-based parametric representation for said each respective grid cell in which the at least one edge of the at least one sign is detected to output the parametric representation of the at least one sign.

According to another embodiment, an apparatus comprises means for receiving, by a computer vision system, a request to detect and encode at least one sign depicted in an input image into a parametric representation of the at least one sign. The apparatus also comprises means for assigning respective one or more processing nodes of the computer vision system to independently process each respective grid cell of the input image to detect at least one edge of the at least one sign. Said processing nodes are assigned based on a proximity to said each respective grid cell, and said each respective grid cell is among a plurality of grid cells created by overlaying a grid onto the input image. The apparatus further comprises means for encoding, by said respective processing nodes, an angle and a location of a detected at least one edge as edge parameters of a cell-based parametric representation for said each respective grid cell. The apparatus further comprises means for aggregating the cell-based parametric representation for said each respective grid cell in which the at least one edge of the at least one sign is detected to output the parametric representation of the at least one sign.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 7A is a diagram illustrating a parametric representation of a detected sign edge, according to one embodiment;

FIG. 7B is a diagram illustrating a multi-channel output of a parametric representation of detected sign edges, according to one embodiment;

DESCRIPTION OF SOME EMBODIMENTS

Examples of a method, apparatus, and computer program for providing a parametric representation of signs are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
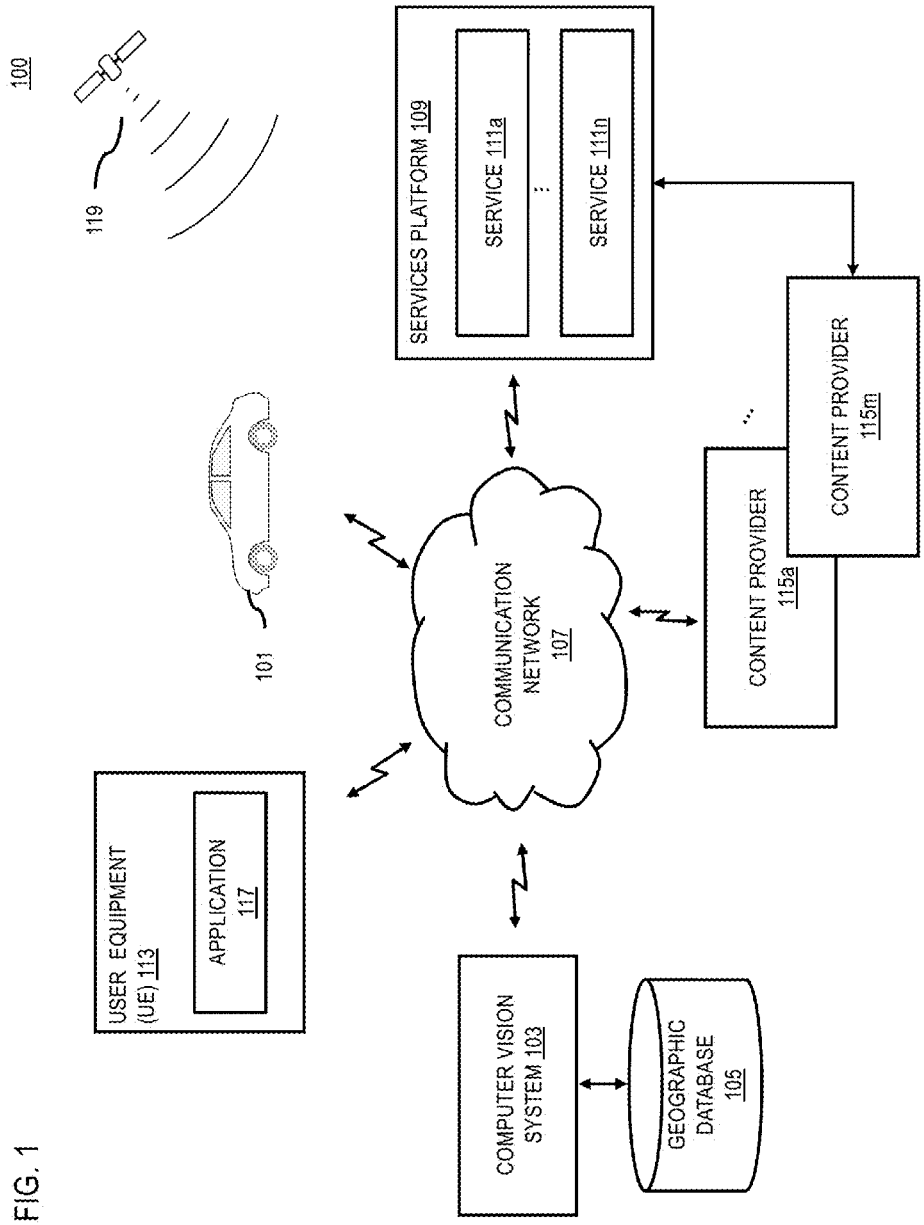
FIG. 1 is a diagram of a system capable of providing a parametric representation of signs, according to one embodiment.

FIG. 1 is a diagram of a system capable of providing a parametric representation of signs, according to one embodiment. As discussed above, autonomous driving has quickly become an area of intense interest, with recent advances in machine learning, computer vision and compute power enabling real-time mapping and sensing of a vehicle's environment. Such an understanding of the environment enables autonomous, semi-autonomous, or highly assisted driving in a vehicle (e.g., a vehicle 101) in at least two distinct ways.

First, real-time sensing of the environment provides information about potential obstacles, the behavior of others on the road, and safe, drivable areas. An understanding of where other cars are and what they might do is critical for a vehicle 101 to safely plan a route. Moreover, vehicles 101 generally must avoid both static (lamp posts, e.g.) and dynamic (cats, deer, e.g.) obstacles, and these obstacles may change or appear in real-time. At least some of this information can be provided by signs detected near travel routes. These signs, for instance, include both road signs and well as any other sign visible from a travel route (e.g., store signs, billboards, etc.). More fundamentally, vehicles 101 can use a semantic understanding of what areas around them are navigable and safe for driving based in part on such signs. Even in a situation where the world is completely mapped in high resolution, exceptions will occur in which a vehicle 101 might need to drive off the road to avoid a collision, or where a road's geometry or other map attributes like direction of travel have changed. In this case, detailed mapping may be unavailable, and the vehicle 101 has to navigate using real-time sensing of road features or obstacles using a computer vision system (e.g., a computer vision system 103).

A second application of vision techniques in autonomous driving is localization of the vehicle 101 with respect to a map of reference landmarks (e.g., with respect to known sign locations). Understanding one's location on a map enables planning of a route, both on fine and coarse scales. On a coarse scale, navigation maps allow vehicles 101 to know what roads to use to reach a particular destination. However, on a finer scale, maps allow vehicles 101 to know what lanes to be in and when to make lane changes. Knowing this information is important for planning an efficient and safe route, for in complicated driving situations maneuvers need to be executed in a timely fashion, and sometimes before they are visually obvious. In addition, localization with respect to a map enables the incorporation of other real-time information into route planning. Such information could include traffic, areas with unsafe driving conditions (ice, fog, potholes, e.g.), and temporary road changes like construction.

With respect to localization (e.g., localization to a more accurate position in a roadway such as in a specific lane) and also generally with respect to autonomous driving, high accuracy and real-time localization of vehicles 101 is needed. Traditionally, most vehicle navigation systems have accomplished this localization using GPS, which generally provides a real-time location with a 95% confidence interval of 7.8 meters. However, in complicated urban environments, reflection of GPS signals can further increase this error, such that one's location may be off by as much as 30 meters. Given that the width of many lanes is 3-4 meters, this accuracy is not sufficient to properly localize a vehicle 101 (e.g., an autonomous vehicle) so that it can make safe route planning decisions. Other sensors, such as inertial measurement units (IMUs) can increase the accuracy of localization by taking into account vehicle movement, but these sensors tend to drift and still do not provide sufficient accuracy for localization.

Figure 2:
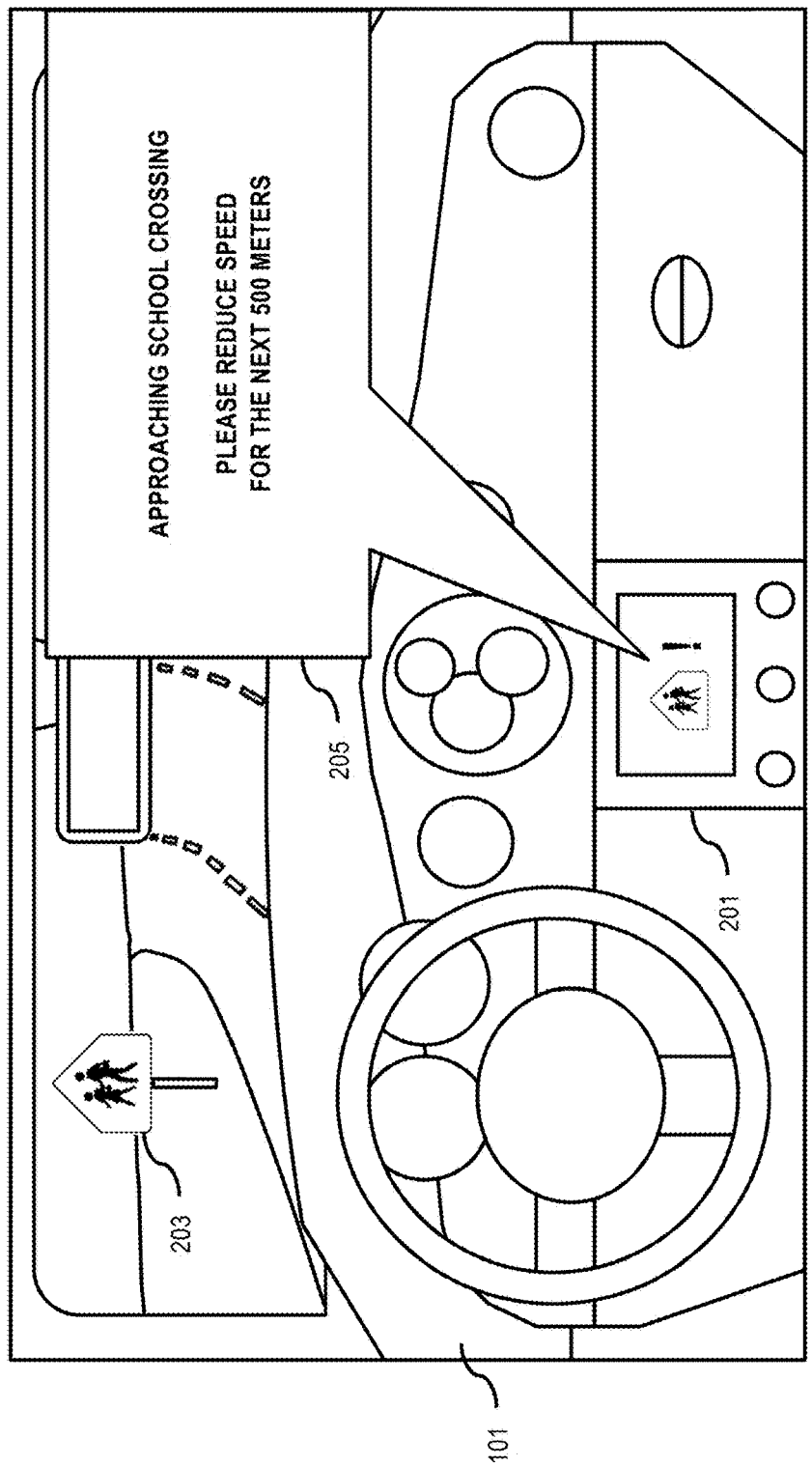
FIG. 2 is diagram illustrating example vehicle navigation system that can obtained environmental information and/or employ localization based on signs, according to one embodiment.

In general, a localization accuracy of around 10 cm is needed for safe driving in many areas. One way to achieve this level of accuracy is to use visual odometry, in which features (e.g., signs) are detected from imagery. These features can then be matched to a database of features (e.g., indexed to an accurate location of the feature) to determine one's location. For example, FIG. 2 illustrates a vehicle 101 equipped with a navigation or autonomous vehicle control system 201 that employs an embodiment of a computer vision-based localization system as described herein. In this example, the vehicle control system 201 uses a computer vision system according to the embodiments described herein to detect a road sign 203 that indicates the vehicle 101 is approaching an upcoming school crossing. The vehicle control system 201 can either slow down autonomously or provide an alert to the driver of the vehicle 101 to manually slow down. By employing visual odometry with respect to the detected sign 203, the control system 201 can more accurately localize a position of the vehicle 101 to enhance safety while traveling through the approaching school crossing.

In contrast, traditional feature-based localization that both detects features and localizes against them generally rely on low-level features. However, low-level features typically used in these algorithms (e.g., Scale-Invariant Feature Transform (SIFT) or Oriented FAST and rotated BRIEF (ORB)) tend to be brittle and not persist in different environmental and lighting conditions. As a result, they often cannot be used to localize a vehicle on different days in different weather conditions. Aside from reproducibility, the ability to detect and store higher level features of different types can provide better and more accurate localization with higher confidence.

In response to these issues, the system 100 of FIG. 1 (e.g., including the computer vision system 103) focuses on high level features that have semantic meaning for human beings. One such feature that is important to autonomous driving is the detection of signs (e.g., road signs). Generally, road signs are ubiquitous in driving environments, and they are also standardized and highly visible. Other high-level features such as lane lines provide little information at every capture about one's longitudinal distance (e.g., the vehicle 101's longitudinal distance) along a road because of their linear nature. In contrast, the sizes, locations, and/or arrangement of signs can be used to determine longitudinal position more accurately than traditional location sensors (e.g., GPS).

One technique that has shown significant ability to detect signs is the use of convolutional neural networks. For example, neural networks have shown unprecedented ability to recognize objects (e.g., signs) in images, understand the semantic meaning of images, and segment images according to these semantic categories. Despite the successful use of neural networks to detect signs, a fundamental problem remains. Neural network-based sign detectors must compromise between flexibility of representation and semantic understanding of the sign shape. On the one hand, a pixel-based segmentation of an image of a road can show every pixel that corresponds to a sign. Yet converting this image mask into a sign model requires a significant amount of additional processing. The detector output often is a sign blob, and it could be challenging to estimate the number of edges from the sign blob. In another scenario, a single sign could be detected as multiple components in which case it could be non-trivial and require significant computational resources to join them. In one embodiment, a more natural representation corresponds to a parametric representation in which a sign is represented by a set of parameters that encode the shape and position of the sign. The most basic shape that has been commonly and traditionally used to detect objects is a rectangular bounding box. More recently, the problem of detecting objects has been approached from the perspective of a regression problem with the advent of the You Only Look Once (YOLO) real-time object detector and related approaches. These approaches have the benefit that they are well suited for real-time applications because they require only one forward pass through a network.

However, the majority of these approaches predict rectangular axis-aligned bounding boxes, which may not provide sufficient information (i.e., are not rich enough representations of signs) to provide the localization accuracy needed to support autonomous driving and/or other driving requirements. In other words, bounding boxes leave out useful information about sign faces. For example, perspective and out of plane distortions subtly change the shape of signs from rectangles, and this information can be used to help with localization. By representing objects as rectangles, this crucial information is left out, and the ability to localize based on object detections is diminished.

Figure 3:
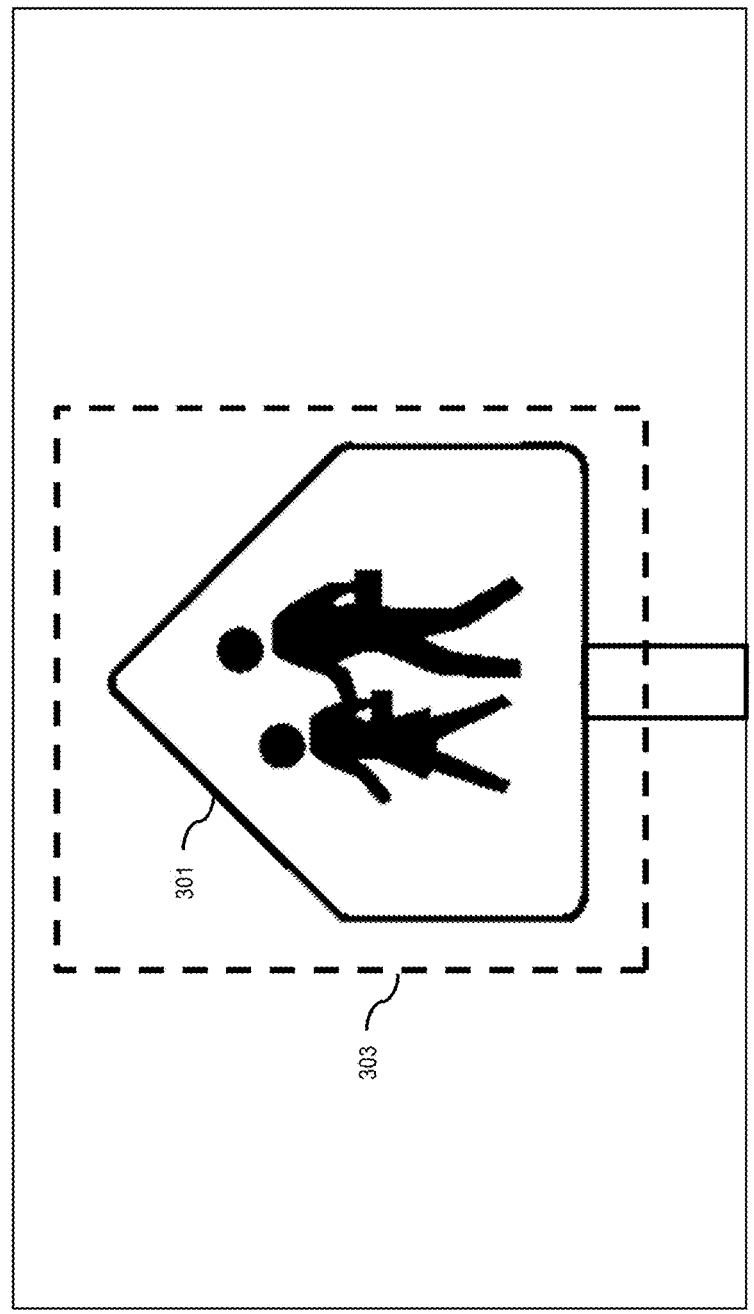
FIG. 3 is a diagram of an input image of a detected signed marked by a bounding box, according to one embodiment.

An example of such a bounding box representation is shown in FIG. 3. In the example of FIG. 3, a sign 301 is detected by a computer vision system. The system then designates the detected sign using a bounding box 303 that encompasses the area of the input image in which the sign is detected. However, as shown, the bounding box 303 is merely a rectangle that does not follow the edges of the detected sign. Accordingly, the bounding box 303 does not provide for a rich representation of the sign. In this case, rich refers to capturing additional characteristics of the detected sign such as its edges or shape. In other words, the rectangular shape of the bounding box 303 fails to reflect the actual pentagonal shape of the sign 301. With respect to visual odometry or localization, the shape, size, etc. of a sign can be important to determine an accurate position of the vehicle 101. Given that most signs are polygons, it is more natural and useful to represent them parametrically as polygons.

In addition, the success of localization based on features from an image depends on the precise localization of those features within the image. From this standpoint, pixel-based approaches present another challenge. To increase the precision of the network output, more pixels must be used. Thus, an increase in the precision of the localization of features requires an increase in the number of pixels, which in turn increases the number of computational operations and the potentially the number of weights for the network. This behavior is undesirable, and in general parametric representations do not suffer from this problem because they can specify the values of parameters with arbitrary precision.

Accordingly, the system 100 of FIG. 1 introduces a flexible approach to parametrically represent a sign model in such a way that they can be easily and robustly represented in a processed by a computer vision system comprising multiple processing nodes such as a neural network. In one embodiment, the system 100 encodes a polygon representing a detected sign as a set of edges that are associated with a center point. Each edge is predicted independently by output cells of the computer vision system (e.g., a neural network) that are close to the edge, such that, in one embodiment, edges are encoded redundantly by multiple output cells or processing nodes. This redundancy increases the robustness of the detection and allows for more accurate localization because duplicate predictions can be used to produce a single, smooth prediction. This representation enables the encoding of signs with arbitrary numbers of edges that are at arbitrary angles. The conversion between the encoded (e.g., a parametric representation) and decoded representations (e.g., a polygonal model) of detected signs is generally computationally cheap, such that it can be performed in real-time while a vehicle 101 is driving. In one embodiment, such a representation enables a neural network to describe the semantics of an object model of a sign without imposing burdensome constraints.

Although the various embodiments described herein discuss a computer vision system 103 that employs a neural network (e.g., a convolutional neural network) to recognize signs, sign faces, and/or sign edges in input image data, it is contemplated that any type of computer vision system 103 using any other machine learning technique or other image processing technique can use the approaches to parametric representations of signs as described herein. In addition, although the parametric representations are discussed with respect to sign, it is also contemplated that the parametric representations can be used to represent any object with defined edges in captured image data.

Figure 4:
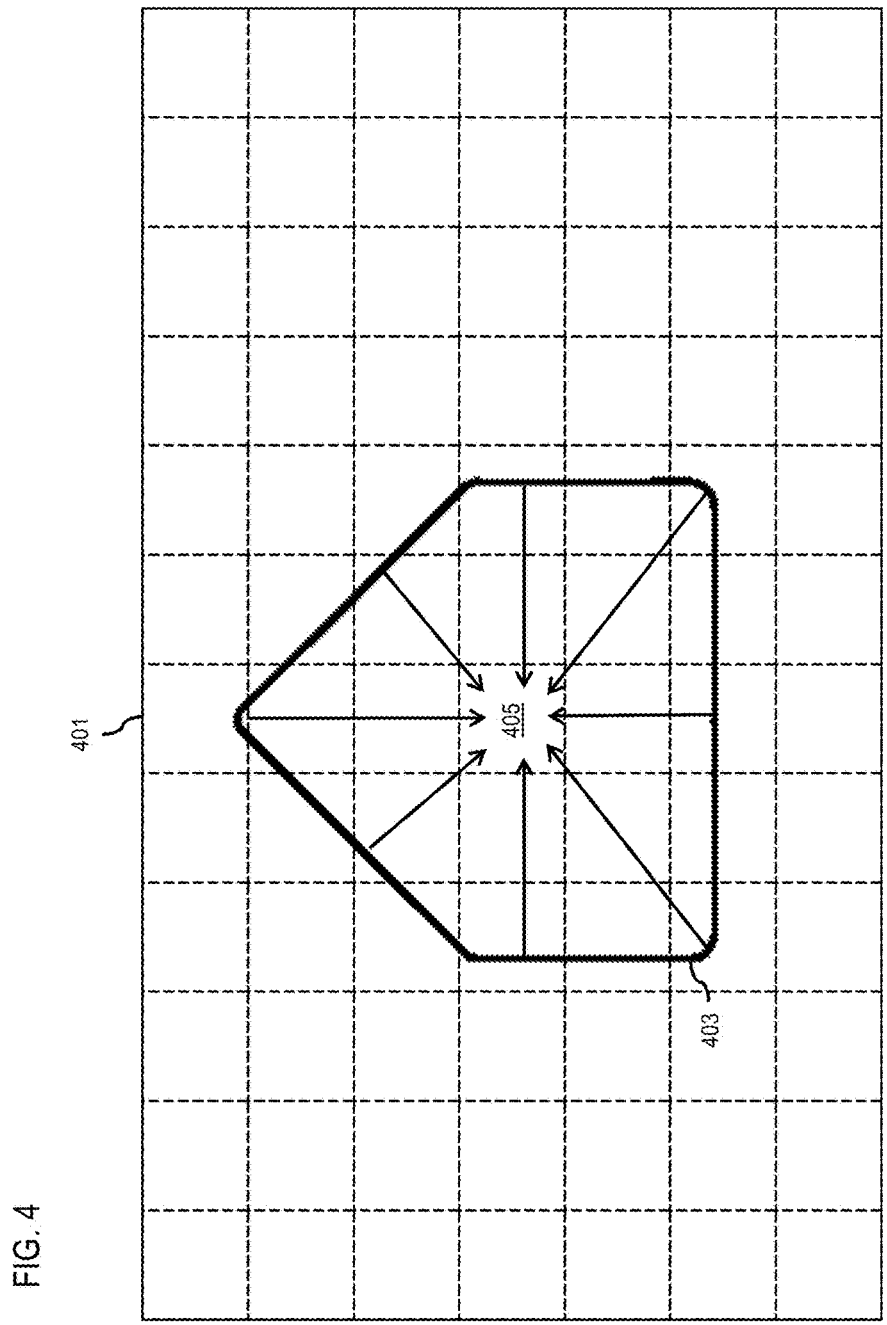
FIG. 4 is a diagram of an input image of a detected signed processed by a central node of a neural network, according to one embodiment.

Typically signs are relatively simple shapes that are almost always convex. As a result, it is natural to represent them as convex polygons, which are composed of an arbitrary number of line segments at arbitrary angles. In contrast, the output of a convolutional neural network typically is a fixed size tensor. As shown in FIG. 4, this output traditionally can be thought of as a 2D grid 401 of cells that overlaps with the input image depicting a sign 403. In one embodiment, each cell is associated with a different processing node or neuron, and can contain multiple values with each of these values said to correspond to a different channel.

Historical approaches (YOLO, e.g.) to the prediction of polygons using a neural network assign all parameters related to a polygon representing the sign 403 to a cell 405 that lies closest to the center of that polygon. This central cell 405 is responsible for recognizing that it is both the correct cell to make a prediction, and for predicting the parameters that represent the shape of the entire sign 403. This setup can be inadequate for a real-time localization use case for at least three reasons:

(1) As the sign 403 becomes larger, the cell 405 must gather information from further and further away. The transfer of information laterally in a convolutional neural network is in some sense "slow," so signs that have a dimension that is close to the size of the entire image may have inaccurate shapes.

(2) Only one cell or processing node (e.g., cell 405) is making a prediction. If the active output cell makes a mistake, there is no way to correct it.

(3) There are many unused output cells or processing nodes. For example, all cells in the grid other than cell 405 are unused with respect to making a prediction of a polygon to represent the sign 403. In other words, a sign that overlaps with half of the image will still have only one active output cell or processing node.

Figure 5:
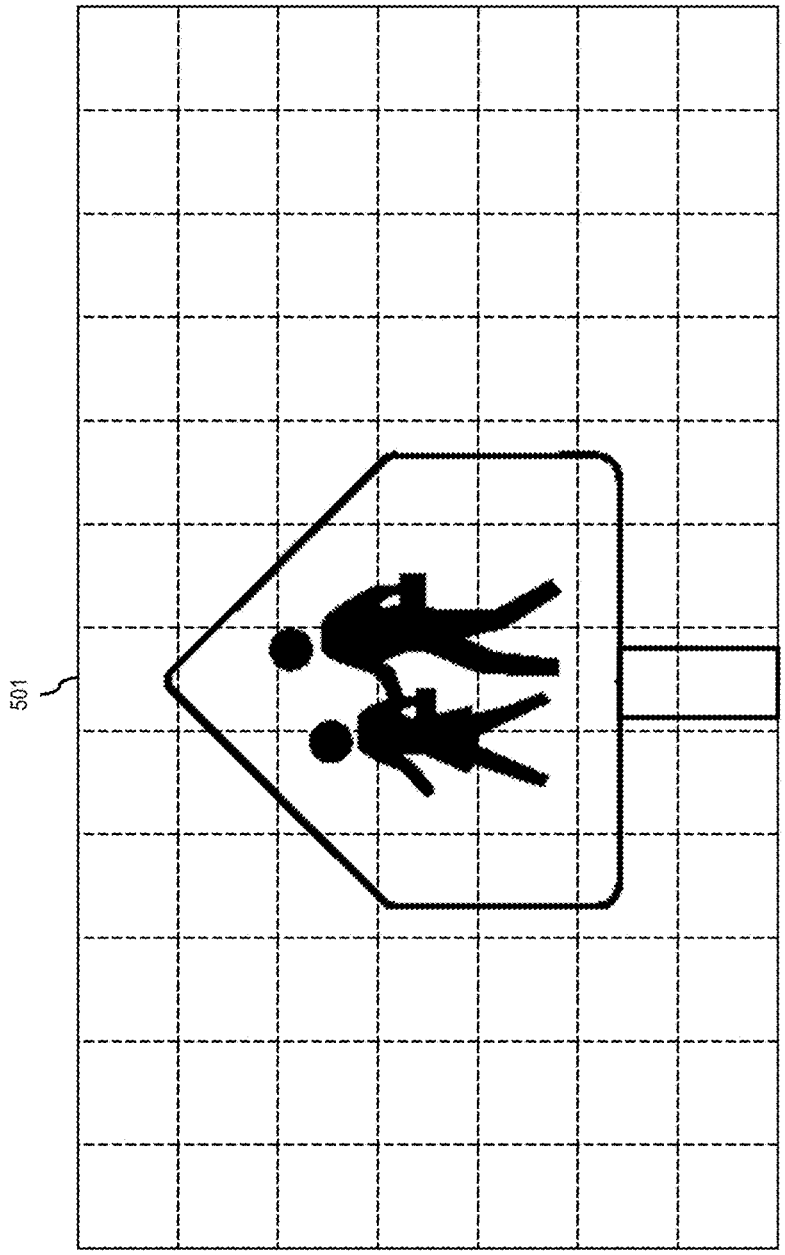
FIG. 5 is a diagram of an input image overlaid with a grid, according to one embodiment.

In light of these shortcomings, the system 100, in one embodiment, uses a grid-based parametric representation of detected signs. For example, as shown in FIG. 5 a grid 501 segments an input image (e.g., the image as shown in FIG. 3) into individual grid cells. In one embodiment, such a grid can be output by a fully convolutional neural network, which has the advantage of being computationally fast without having an excess of parameters that might lead to overfitting. For example, with respect to a neural network or other similar parallel processing system, each of the cells of the grid 501 can be processed by a different neuron or processing node to more efficiently employ the available neurons or nodes, and distribute the computational load for processing the entire input image. In other words, in one layer of the neural network, the scope of each neuron corresponds to the extent of the input image area within each respective grid cell. Each neuron or node can make is prediction (e.g., detection of sign edge or face) for each individual grid cell, thereby advantageously avoiding the computational resource burden associated having only one central cell processing the image data for the entire sign, or having to have a fully connected layer.

In one embodiment, the input image of FIG. 5 is captured in real-time by a camera system of the vehicle 101 as raster images at a predetermined pixel resolution. In one embodiment, the input image can be captured using cameras sensitive to visible light, infra-red, and/or any other wavelength of light. To support real-time operation, the input image can be part of an image stream captured at a relatively high frequency (e.g., 20 Hz, 30 Hz, or higher). Each frame of the image stream can then be processed to provide real-time detection of signs.

Figure 6:
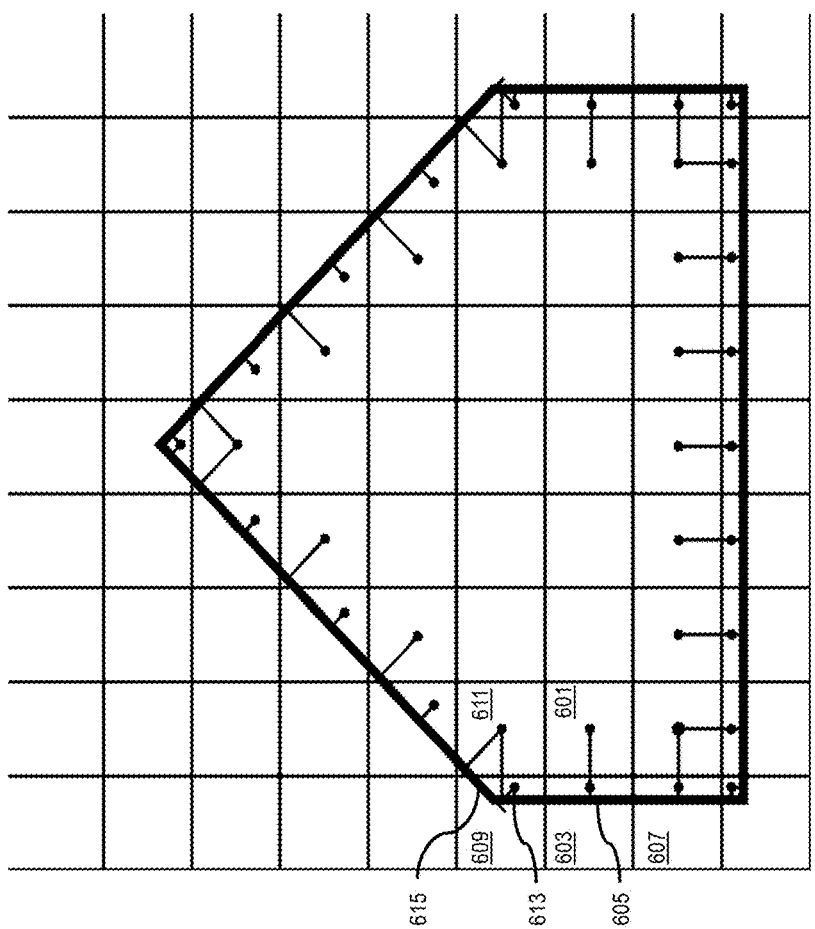
FIG. 6 is a diagram illustrating a grid-based processing of a input image to independently detected sign edges, according to one embodiment.

In one embodiment, as shown in FIG. 6, cells or associated processing nodes are responsible for predicting only nearby line segments. By way of example, the system 100 can configure a threshold distance for determining whether a cell is nearby or proximate to a given line segment or edge of a sign. In one embodiment, distance is measured with respect to the grid dividing the input image. As noted above, when an input image is divided into grid cells, the system 100 also designates processing nodes or neurons for processing the image data in that cell. In one embodiment, a processing node or cell can also process image data from other cells that are passed to the cell (e.g., as described with passing image data to a central node when that central node is responsible for processing image data for the entire sign as described above). In this way any cell that is within the threshold distance of an edge of a sign can independently make a prediction of the attributes of the edge (e.g., position, angle, predicted sign center, etc.), so that when multiple nearby cells make a prediction, multiple predictions can be processed to determine a more robust overall prediction. In one embodiment, "independently" refers to a cell or processing node making its own prediction based on the portion of the image data within its scope (e.g., the portion of the input image falling within the grid cell to which it is assigned, and/or the portion of the input image falling in the nearby cells within the distance threshold).

In the example of FIG. 6, the system 100 is configured with a distance threshold of 1.5 cells, so that a given cell or processing node will process the image data from its cell and any cells within 1.5 cell widths to detect any sign edges, sign faces, etc. As shown, the processing node of cell 601 processes the image data contained in the cell 601 (e.g., no edge detected) as well as the image data in neighboring cell 603 which falls within 1.5 cell widths. In this example, an edge is detected in cell 603 by cell 601. In addition, the processing node of cell 603 will process the image data in its cell 603 and will also output a prediction with respect to the edge 605. Accordingly, there are at least two independent predictions of the edge 605 (e.g., by cells 601 and 603) to provide for redundant results. Other predictions of the edge 605 may also be provided by other neighboring cells (e.g., cells 607 and 609).

In one embodiment, cells that are close to more than one edge are responsible for predicting multiple edges. For example, the processing node of cell 611 is within the threshold distance of edges 613 and 615. The node of cell 611, therefore, will make a prediction of the position, angle, etc. of both edges 613 and 615. Each of the other cells in the grid performs the same prediction process to cover the entire image to collectively predict a parametric representation of the entire sign from the individual and independent parametric representations (e.g., a cell-based parametric representation) for each individual grid cell as shown in FIG. 6.

FIG. 7A is a diagram illustrating a parametric representation of a detected sign edge, according to one embodiment. In one embodiment, the system 100 encodes a detected sign edge in each cell as a parameters representing at least a location and angle of the predicted edge in a parametric representation of the edge. In one embodiment, the system 100 determines and includes a confidence level for the detected edge as an additional parameter of the parametric representation. By way of example, the location and angle of the predicted edge can be indicated using an r-theta representation of the line with respect to a reference point and/or a reference angle for each grid cell. It is noted that r-theta representation is provided by way of illustration, and not as a limitation. It is contemplated that any equivalent system for indicating a line segment in a grid cell can be used according to the various embodiments described herein.

In an example using an r-theta representation as shown in FIG. 7, the prediction of each edge (e.g., edge 701) can be encoded as three values: a confidence (not shown), an angle 703, and a radius 705. The confidence value is 1 if the edge exists and 0 otherwise. In one embodiment, during prediction by the system 100 (e.g., neural network), the confidence values are probabilities that a detected edge is a sign edge (e.g., 0 corresponding to zero probability of being a sign edge, 1 corresponding to a highest probability of being a sign edge, and other values spanning the range to indicate different probabilities). To calculate the radius 705 and angle 703, the centroid 707 of the intersection of the sign and the cell is first calculated to represent a reference point for the grid cell. By using the centroid 707 of the intersection (e.g., the portion of the image area in each cell that corresponds to the sign's face) as the reference point, the centroid is ensured to be located on the sign face as opposed to a non-sign portion of the image area. A line segment is drawn from the centroid 707 to the sign edge 701 such that it is perpendicular to the edge 701. The angle 703 (e.g., angle θ) is then the angle 703 that this line makes with a reference angle, and the radius 705 is the length of the segment.

In one embodiment, the three values discussed above can be used to encode any line segment. In another embodiment, as shown in FIG. 7B, that system 100 can provide multiple such output channels 723a-723n (also collectively referred to as output channels 723) from each cell that are each responsible for a certain angular range. For example, a cell 721 could have output channels 723a-723n, each with a confidence, a radius, and an angle for any detected edge that falls within the angular range for the corresponding output channel 723. The first such output (e.g., output channel 723a) would be responsible for edges with angles between 0 and 45 degrees, the second (e.g., output channel 723b) between 46 and 90 degrees, and so on. These ranges are provided by way of illustration and not as limitation. It is contemplated that the system 100 can use any number of ranges (including just one range covering 0 to 360 degrees) that respectively span any angular range. This arrangement advantageously makes each output channel 723 an expert detector of lines that fall within a certain angular range. For example, narrower angular ranges for each output channel can enable each corresponding edge detector to become more specialized through machine learning, but can also increase complexity by increasing the overall number of detectors.

Figure 8:
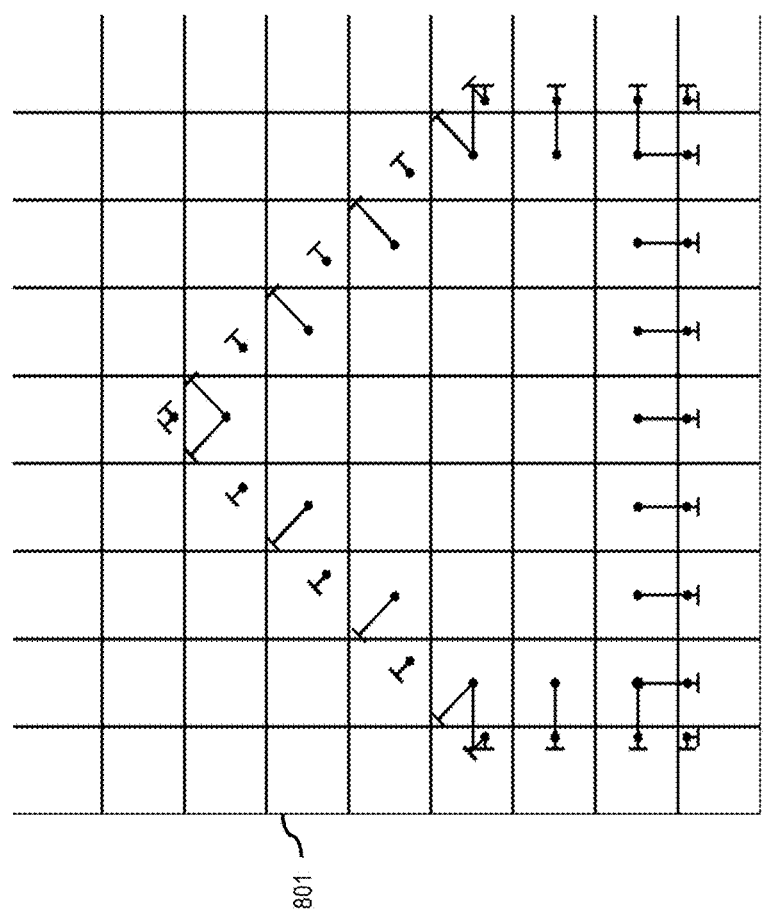
FIG. 8 is diagram illustrating an aggregation of cell-based parametric representations of sign edges to represent an entire sign, according to one embodiment.

FIG. 8 is diagram illustrating an aggregation of cell-based parametric representations of sign edges to represent an entire sign, according to one embodiment. The parametric representation 801 aggregates the respective parametric representations generated for each individual grid cell (e.g., a cell-based parametric representation) into an overall representation of the detected sign. Each individual cell of the parametric representation 801 is determined independently the corresponding responsible processing nodes to represent each edge detected in each cell as a line segment (e.g., expressed in r-theta format or other equivalent format). As a result of this grid-based approach, the basic unit of representation of a sign then becomes each cell of the grid, in which each detected sign edge is independently and piecewise encoded into individual parametric representations (e.g., a cell-based parametric representation). The aggregate of these piecewise parametric representations collectively comprise the parametric representation of the entire sign.

In one embodiment, the system 100 can include additional attributes of the detected sign edge as additional parameters of the sign edge. For example, such additional attributes can include, but are not limited to: (1) whether a sign face is has any internal edges (e.g., for signs with internal openings or other complex shapes such as concave polygons); (2) a surface color of a sign; (3) variability of the sign (e.g., changes based on time of day); (3) temporary versus permanent sign; and/or (4) any other rich information describing the sign, sign face, sign edges, etc.

Although, the example of FIG. 8 depicts a parametric representation of sign edges in a two-dimensional grid, it is contemplated that the various embodiments described herein are also application to higher dimensional representations. For example, the parametric representations can be applied to an n-dimensional space, wherein n≥2, by representing the detected edges as a n−1 dimensional hyperplane. The system 100 can then reassemble the polygon shape of the detected sign from the individual line segments as further discussed below with respect to FIGS. 14 and 15.

Figure 9:
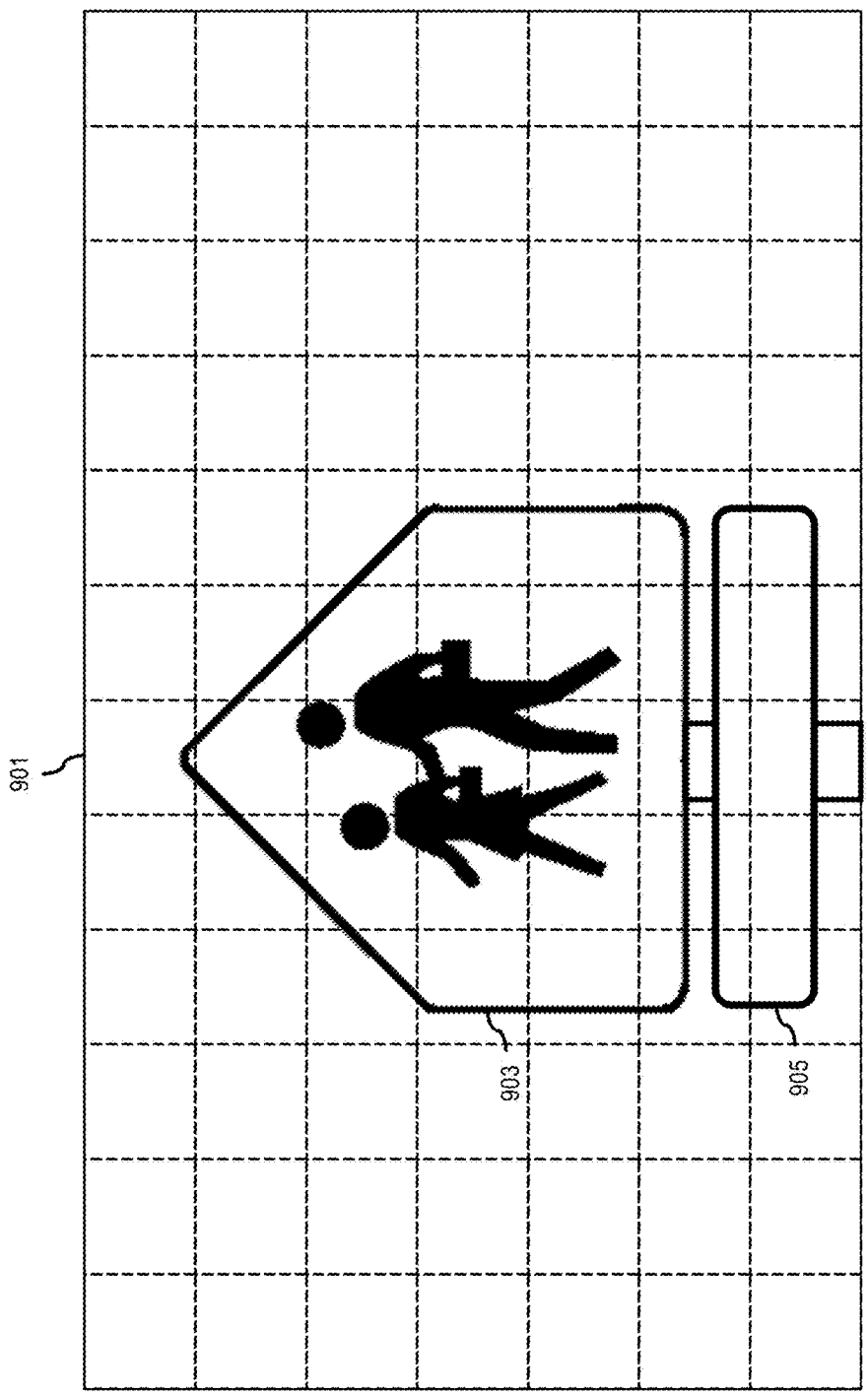
FIG. 9 is a diagram of an input image depicting multiple signs, according to one embodiment.

However, in cases where there are multiple signs next to one another, it is not clear to which sign a particular edge belongs. FIG. 9 is a diagram of an input image 901 depicting multiple signs 903 and 903, according to one embodiment. As shown in FIG. 9, the input image 901 depicts a first sign 903 and a second sign 905 positioned directly below the first sign 903. As a result, when the cells predict or detect sign edges according to the various embodiments described there can be potential confusion about which edge belongs to which cell, or even whether there are multiple cells depicted in the first place. To address this potential confusion, in one embodiment the processing nodes of each cell also are trained to predict a sign center when a sign edge is detected. Each cell can use the image data available in the each of respective cells and/or a predetermined extent of neighboring cells (e.g., within 1.5 or 2 cell widths) to make a prediction of where the center of the sign is based on the detected sign edge. In one embodiment, the sign center can be indicated in the form of X, Y displacement from the cell center to the center of the sign. The predicted sign center can then be included in the cell-based parametric representation as another parameter associated with each detected edge.

In one embodiment, the system 100 can use the sign center parameter that is encoded for the parametric representation of each detected sign edge to cluster cells and/or their cell-based parametric representations that are predicting the same sign. For example, cell-based representations whose predicted sign center parameters match within a threshold value can be group together as being associated with the same sign. In one embodiment, this grouping based on the predicted sign centers can be performed using through traditional clustering approaches like the mean shift or DBSCAN algorithms.

Figure 10:
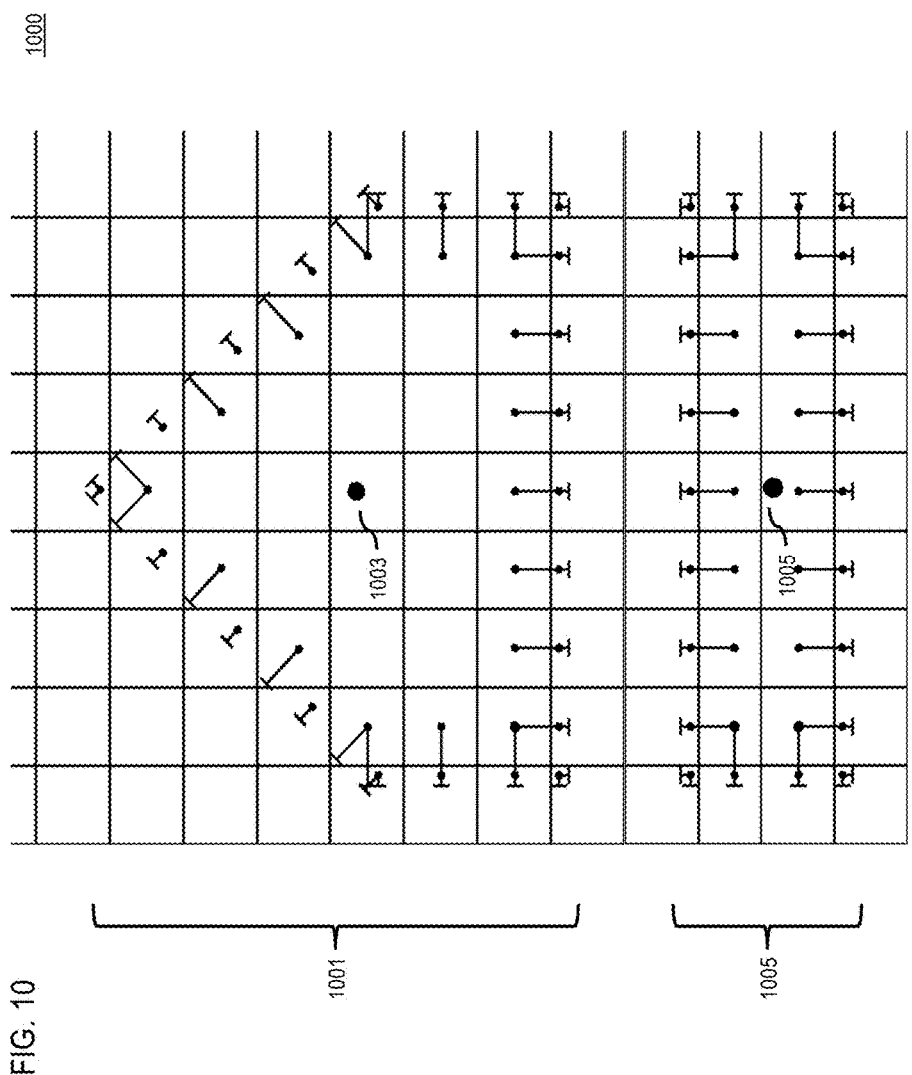
FIG. 10 is a diagram of parametric representations of the multiple signs detected in the example of FIG. 9, according to one embodiment.

FIG. 10 is a diagram of parametric representations of the multiple signs detected in the example of FIG. 9, according to one embodiment. As shown in FIG. 10, the system 100 processes the input image of FIG. 9 to generate the parametric representation 1000. In this example, each cell predicts a sign center of each detected edge as discussed above. The system 100 then clusters each of the parametric representations generated by each cell based on the predicted sign center. This clustering resulted in two clusters: a first cluster 1001 of predicted edges with a predicted sign center 1003, and a second cluster 1005 of predicted edges with a predicted sign center 1005. The system 100 then designates in cluster or group as respective parameter representations of the two different signs depicted in the input image.

Returning to FIG. 1, as shown, the system 100 includes a computer vision system 103 configured to perform the functions associated with generating and/or decoding the parametric representations of signs detected in an input image according to the various embodiments described herein. In one embodiment, the computer vision system 103 includes a neural network or other machine learning/parallel processing system to automatically detect features such as signs in image data to support localization of, e.g., a vehicle 101 within the sensed environment. In one embodiment, the neural network of the computer vision system 103 is a traditional convolutional neural network consisting, for instance, of multiple layers of collections of one or more neurons which are configured to process a portion of an input image. In one embodiment, the receptive fields of these collections of neurons (e.g., a receptive layer) can be configured to correspond to an area of an input image delineated by a respective a grid cell generated as described above.

In one embodiment, the computer vision system 103 also has connectivity or access to a geographic database 105 which represents mapped geographic features to facilitate visual odometry to increase localization accuracy. The geographic database 105 can also store parametric representations of signs and other similar features and/or related data generated or used to encode or decode parametric representations of signs according to the various embodiments described herein.

In one embodiment, the computer vision system 103 has connectivity over a communication network 107 to a services platform 109 that provides one or more services 111a-111n (also collectively referred to as services 111). By way of example, the services 111 may be third party services and include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services 111 uses the output of the computer vision system 103 (e.g., parametric representations of lane lines) to localize the vehicle 101 or a user equipment 113 (e.g., a portable navigation device, smartphone, portable computer, tablet, etc.) to provide services 111 such as POI recommendations, advertising intelligence, etc.

In one embodiment, the computer vision system 103 may be a platform with multiple interconnected components. The computer vision system 103 may include multiple servers, intelligent networking devices, computing devices, components and corresponding software for providing parametric representations of signs. In addition, it is noted that the computer vision system 103 may be a separate entity of the system 100, a part of the one or more services 111, a part of the services platform 109, or included within the UE 113 and/or vehicle 101.

In one embodiment, content providers 115a-115m (collectively referred to as content providers 115) may provide a content or data (e.g., including geographic data, parametric representations of mapped features, etc.) to the geographic database 105, the computer vision system 103, the services platform 109, the services 111, the UE 113, the vehicle 101, and/or an application 117 executing on the UE 113. The content provided may be any type of content, such as map content, textual content, audio content, video content, image content, etc. In one embodiment, the content providers 115 may provide content that may aid in the detecting and classifying of lane lines and/or other features in image data. In one embodiment, the content providers 115 may also store content associated with the geographic database 105, computer vision system 103, services platform 109, services 111, UE 113, and/or vehicle 101. In another embodiment, the content providers 115 may manage access to a central repository of data, and offer a consistent, standard interface to data, such as a repository of probe data, speed limit for one or more road links, speed information for at least one vehicle, traffic jam threshold for at least one road link, other traffic information, etc. Any known or still developing methods, techniques or processes for retrieving and/or accessing features for road links from one or more sources may be employed by the computer vision system 103.

In one embodiment, the UE 113 and/or vehicle 101 may execute a software application 117 to collect, encode, and/or decode signs detected in image data into the parametric representations according the embodiments described herein. By way of example, the application 117 may also be any type of application that is executable on the UE 113 and/or vehicle 101, such as autonomous driving applications, mapping applications, location-based service applications, navigation applications, content provisioning services, camera/imaging application, media player applications, social networking applications, calendar applications, and the like. In one embodiment, the application 117 may act as a client for the computer vision system 103 and perform one or more functions of the computer vision system 103 alone or in combination with the system 103.

By way of example, the UE 113 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 113 can support any type of interface to the user (such as "wearable" circuitry, etc.). In one embodiment, the UE 113 may be associated with the vehicle 101 or be a component part of the vehicle 101.

In one embodiment, the UE 113 and/or vehicle 101 are configured with various sensors for generating or collecting environmental image data (e.g., for processing the computer vision system 103), related geographic data, etc. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the UE 113 and/or vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the UE 113 and/or vehicle 101 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 113 and/or vehicle 101 may include GPS or other satellite-based receivers to obtain geographic coordinates from satellites 119 for determining current location and time. Further, the location can be determined by a triangulation system such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the geographic database 105, computer vision system 103, services platform 109, services 111, UE 113, vehicle 101, and/or content providers 115 communicate with each other and other components of the system 100 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 11:
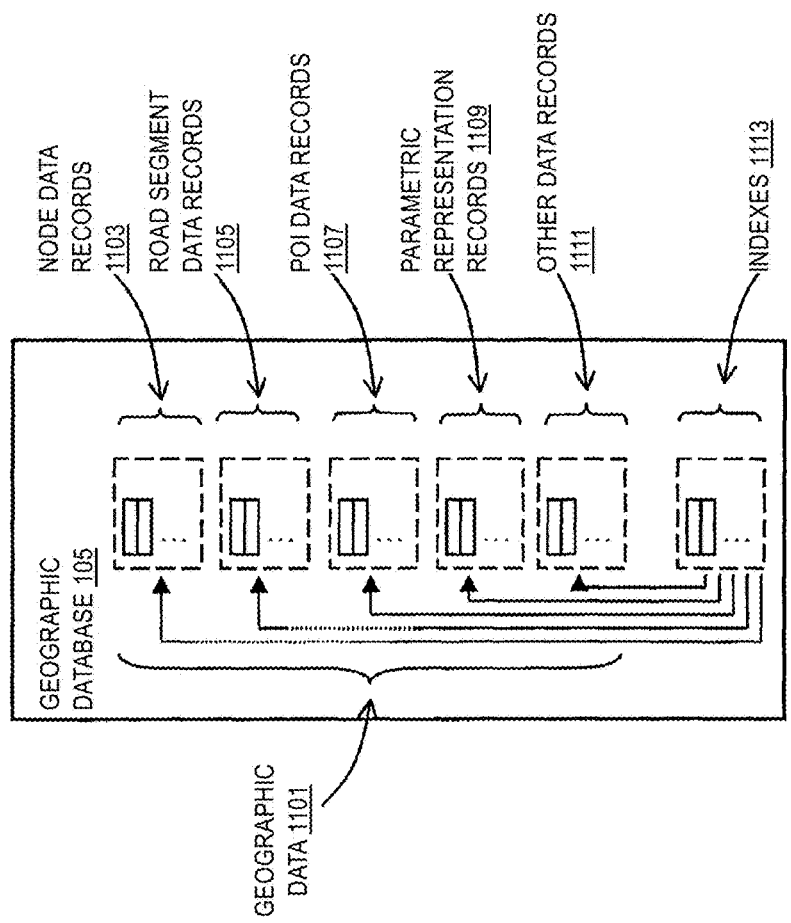
FIG. 11 is a diagram of a geographic database, according to one embodiment.

FIG. 11 is a diagram of a geographic database, according to one embodiment. In one embodiment, the geographic database 105 includes geographic data 1101 used for (or configured to be compiled to be used for) mapping and/or navigation-related services, such as for video odometry based on the parametric representation of signs include, e.g., encoding and/or decoding parametric representations into object models of signs. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three dimensional polygon extrusions. Accordingly, the terms polygons and polygon extrusions as used herein can be used interchangeably.

In one embodiment, the following terminology applies to the representation of geographic features in the geographic database 105.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 105 follows certain conventions. For example, links do not cross themselves and do not cross each other except at a node. Also, there are no duplicated shape points, nodes, or links. Two links that connect each other have a common node. In the geographic database 105, overlapping geographic features are represented by overlapping polygons. When polygons overlap, the boundary of one polygon crosses the boundary of the other polygon. In the geographic database 105, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 105 includes node data records 1103, road segment or link data records 1105, POI data records 1107, parametric representation records 1109, other records 1111, and indexes 1113, for example. More, fewer or different data records can be provided. In one embodiment, additional data records (not shown) can include cartographic ("carto") data records, routing data, and maneuver data. In one embodiment, the indexes 1113 may improve the speed of data retrieval operations in the geographic database 105. In one embodiment, the indexes 1113 may be used to quickly locate data without having to search every row in the geographic database 105 every time it is accessed. For example, in one embodiment, the indexes 1113 can be a spatial index of the polygon points associated with stored feature polygons.

In exemplary embodiments, the road segment data records 1105 are links or segments representing roads, streets, or paths, as can be used in the calculated route or recorded route information for determination of one or more personalized routes. The node data records 1103 are end points corresponding to the respective links or segments of the road segment data records 1105. The road link data records 1105 and the node data records 1103 represent a road network, such as used by vehicles, cars, and/or other entities. Alternatively, the geographic database 105 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 105 can include data about the POIs and their respective locations in the POI data records 1107. The geographic database 105 can also include data about places, such as cities, towns, or other communities, and other geographic features, such as bodies of water, mountain ranges, etc. Such place or feature data can be part of the POI data records 307 or can be associated with POIs or POI data records 1107 (such as a data point used for displaying or representing a position of a city).

In one embodiment, the geographic database 105 can also include parametric representations records 1109 for storing parametric representations of the signs detected from input image data according to the various embodiments described herein. In one embodiment, the parametric representation records 1109 can be associated with one or more of the node records 1103, road segment records 1105, and/or POI data records 1107 to support localization or video odometry based on the features stored therein and the generated parametric representations of lane lines of the records 1109. In this way, the parametric representation records 1109 can also be associated with the characteristics or metadata of the corresponding record 1103, 1105, and/or 1107.

In one embodiment, the geographic database 105 can be maintained by the content provider 115 in association with the services platform 109 (e.g., a map developer). The map developer can collect geographic data to generate and enhance the geographic database 105. There can be different ways used by the map developer to collect data. These ways can include obtaining data from other sources, such as municipalities or respective geographic authorities. In addition, the map developer can employ field personnel to travel by vehicle (e.g., vehicle 101 and/or UE 113) along roads throughout the geographic region to observe features and/or record information about them, for example. Also, remote sensing, such as aerial or satellite photography, can be used.

The geographic database 105 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or UE 113, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

Figure 12:
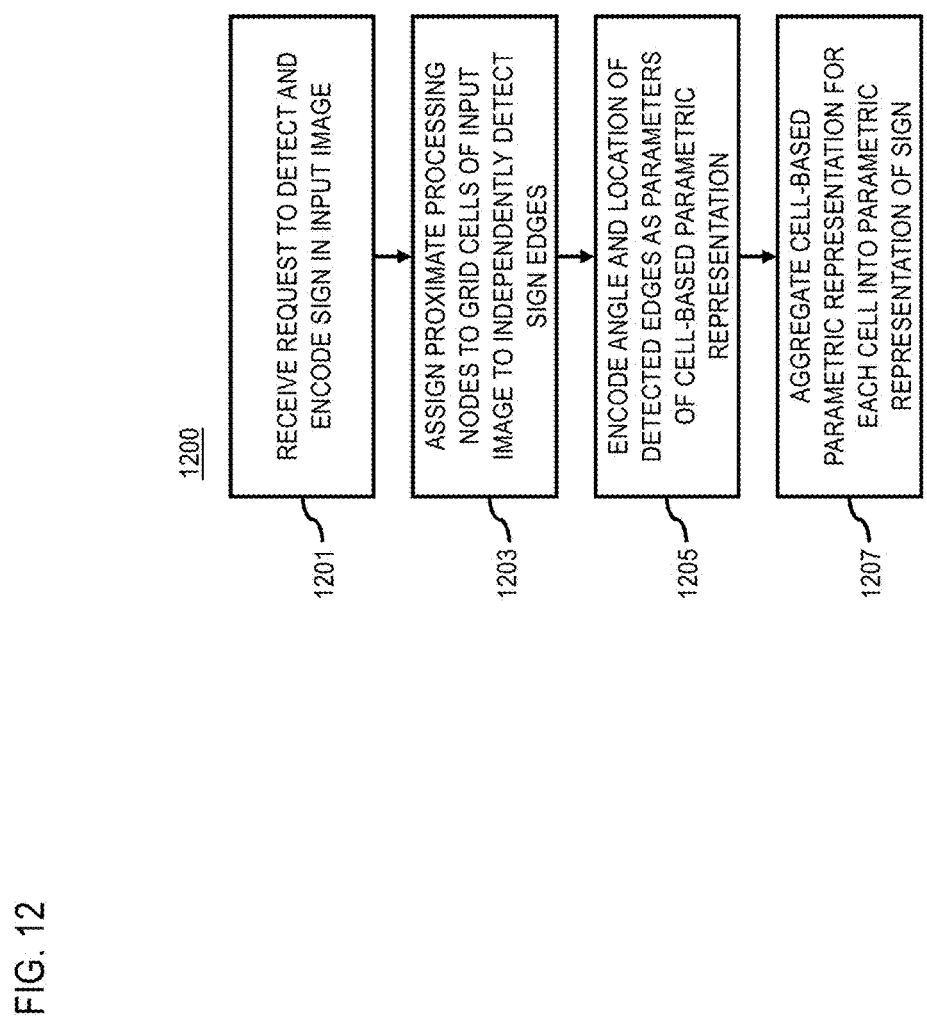
FIG. 12 is a flowchart of a process for generating a parametric representation of signs detected in an input image, according to one embodiment.
Figure 17:
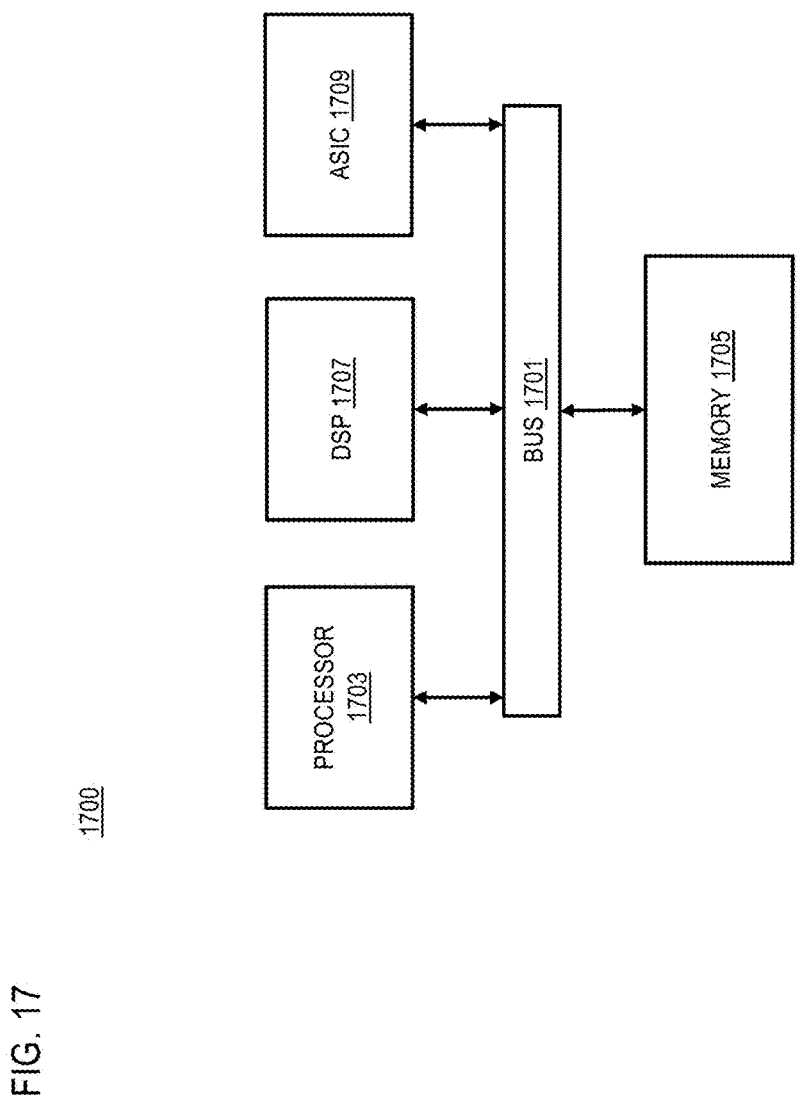
FIG. 17 is a diagram of a chip set that can be used to implement an embodiment of the invention.

FIG. 12 is a flowchart of a process for generating a parametric representation of signs detected in an input image, according to one embodiment. In one embodiment, the computer vision system 103 may perform one or more portions of the process 1200 and may be implemented in, for instance, a chip set including a processor and a memory as shown in FIG. 17. As such, the computer vision system 103 can provide means for accomplishing various parts of the process 1200. In addition or alternatively, the services platform 109 and/or services 111 may perform any combination of the steps of the process 1200 in combination with the computer vision system 103 or as standalone components. Although the process 1200 is illustrated and described as a sequence of steps, it is contemplated that various embodiments of the process 1200 may be performed in any order or combination and need not include all of the illustrated steps.

In step 1201, the computer vision system 103 receives a request to detect and encode at least one sign depicted in an input image into a parametric representation of the at least one sign. In one embodiment, the request is initiated as part of a real-time environmental sensing function of the computer visions system 103 to support, for instance, autonomous or semi-autonomous vehicle operation (e.g., operation of the vehicle 101). For example, the input image can be part of an image capture stream (e.g., from an onboard camera of a vehicle 101) to support video odometry to more accurately localize the vehicle 101 (e.g., localized to within 10 cm accuracy).

In step 1203, the computer vision system 103 assigns respective one or more processing nodes of the computer vision system to independently process each respective grid cell of the input image to detect at least one edge of the at least one sign. For example, the each processing node can be trained (e.g., using machine learning techniques) to detect sign edges (e.g., indicated as a position and angle of a line segment or other geometric representation corresponding to a detected sign edge), sign faces (e.g., the portion of the image corresponding to a sign surface delineated by a sign edge), and/or other sign attributes. In one embodiment, each processing node is independently responsible for making a separate prediction of any edges falling within the image area bounded by the grid cells of the image for which it is responsible, without reference to data external to those cells or receiving input from neighboring processing nodes to facilitate its prediction.

In one embodiment, each respective grid cell is among a plurality of grid cells created by overlaying a grid onto the input image. For example, in one embodiment, the computer vision system 103 segments an input image into a plurality of grid cells, with one or more processing nodes of the computer vision system assigned to process the image data falling within the area of each grid cell. In one embodiment, the grid is comprised of regular shapes (e.g., square, rectangle, etc.), but it is contemplated that grid can also vary in size and/or shape from cell to cell. For example, in areas where higher resolution is needed (e.g., in the center of an image), smaller cells can be used to provide greater resolution. Similarly, larger cells can be used for the periphery of an image, where greater resolution may not be needed. In one embodiment, the resolution or size of the grid can vary with available processing power and/or desired accuracy/ precision of the resulting object models of the signs. However, because the parametric representations described herein are vector based, rasterization of these representations can yield relatively accurate results at a wide range of pixel resolutions. Accordingly, in one embodiment, the grid resolution can be a relatively low level (e.g., 50×38) to advantageously reduce computational resource requirements.

In one embodiment, the computer vision system 103 assigns said processing nodes based on a proximity of the nodes to each respective grid cell. In other words, as previously described, each processing node can process the image data from the cell to which it is assigned as well the image data from neighboring cells within proximity of its first assigned cell. In one embodiment, the computer visions system 103 can apply a distance threshold (e.g., within 1.5 cells, 2 cells, etc.) to determine which grid cells of input image data a particular processing node is to process to detect sign edges, sign faces, etc. according to the various embodiments described herein.

In one embodiment, there are more than one of said processing nodes assigned to process the respective grid cell to generate a plurality of redundant cell-based parametric representations for said each respective grid cell (e.g., when a distance threshold is applied as described above and below). The computer vision system 103 can then process the plurality of redundant cell-based parametric representations are processed into a single cell-based parametric representation to represent the cell-based parametric representation for said each respective grid cell. By way of example, the processing of these redundant representations may include averaging, weighting, smoothing, and/or any other equivalent method to calculate a representative cell-based parametric representation from the redundant results. This single or representative cell-based parametric representation generally is more robust than any individual representation.

For example, multiple nodes are assigned with the applied distance threshold for assigning processing nodes is greater than 1 cell. As the distance threshold increases, the number of assigned processing nodes also increases because larger distance thresholds also means there are a larger number of neighboring cells/processing nodes that fall within that threshold. However, larger distance thresholds can also increase the overall processing load of each individual processing node because the node would be responsible for processing a larger area of the input image. In one embodiment, the computer vision system 103 can vary the distance threshold to balance the robustness obtained from redundant or multiple predictions (e.g., multiple cell-based parametric representations) against available computational resources to handle the additional processing load.

In one embodiment, a cell-based parametric representation includes a plurality of output channels. Each of the plurality of output channels, for instance, corresponds to an edge detector that is responsible for a different range of edge angles. As previously discussed, by narrowing the angular range for which any individual edge detector (e.g., used for a given cell or by a processing node assigned to the cell) is responsible, that edge detector can be trained to more accurately or precisely detect such edges (i.e., become an "expert" in detecting or recognizing edges within the assigned angular range from input image data). In one embodiment, the computer vision system 103 can configure the number of output channels to use by balancing the improved detection capabilities resulting from more narrowly focused edge detectors against the increased computational resource requirements incurred from having an increased number of channels/detectors. For example, the system can be configured with any number of channels that cover any angular range (e.g., 8 output channels with each covering 45 degree angular ranges to cover a full 360 degrees, or 10 output channels with each covering 36 degree angular ranges to cover a full 360 degrees). In one embodiment, an edge angle is determined with respect to a reference angle in each cell and with respect to which side of the edge the sign face is predicted to be.

In step 1205, the computer vision system 103 encodes, by said respective processing nodes, an angle and a location of a detected at least one edge as edge parameters of a cell-based parametric representation for said each respective grid cell. In one embodiment, the computer vision system 103 determines a reference point and a reference angle for said each respective grid cell from which the angle and/or location are specified. In one embodiment, the reference point is a centroid of an area of said each respective grid cell that represents image data corresponding to the at least one sign. The computer vision system 103 then encodes the location of the detected at least one edge as a distance along a line segment drawn from the reference point to the detected at least one edge, wherein the line segment is perpendicular to the detected at least one edge. The computer vision system 103 also encodes the angle of the detected at least one edge in relation to the reference angle. For example, with this encoding scheme, the computer vision system 103 can represent a detected edge parametrically using the following representation comprising a minimum of two parameters: <radius>, <angle>.

In one embodiment, the computer vision system 103 determines a confidence value associated with the detected at least one edge. As described above, the confidence value indicates a probability computed by the processing node that the detected edge is an actual edge of the sign (e.g., 1=high probability, 0=no probability). In one embodiment, the confidence value is further encoded into the cell-based parametric representation, to result in an edge representation comprising a minimum of three parameters: <confidence>, <radius>, <angle>.

In step 1207, the computer vision system 103 aggregates the cell-based parametric representation for said each respective grid cell in which the at least one edge of the at least one sign is detected to output the parametric representation of the at least one sign. In one embodiment, the overall parametric representation of the at least one sign can be a collection of the edge detection results for all grid cells covering the entire input image and/or just a portion of the image corresponding to cells in which sign edges are detected. In addition, when multiple signs are detected in the input image, a separate aggregation or collection of the cell-based parametric representations corresponding to each separate detected sign can be provided as outputs.

Figure 13:
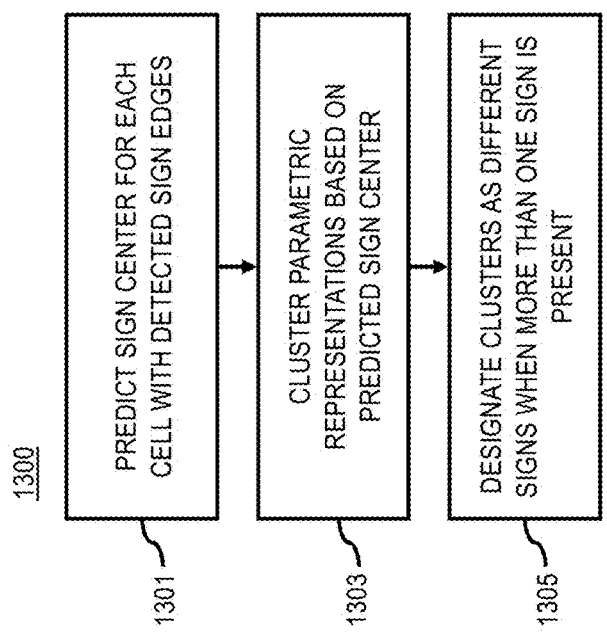
FIG. 13 is a flowchart of a process for clustering parametric representations of signs when multiple signs are present in an input image, according to one embodiment.

FIG. 13 is a flowchart of a process for clustering parametric representations of signs when multiple signs are present in an input image, according to one embodiment. In one embodiment, the computer vision system 103 may perform one or more portions of the process 1300 and may be implemented in, for instance, a chip set including a processor and a memory as shown in FIG. 17. As such, the computer vision system 103 can provide means for accomplishing various parts of the process 1300. In addition or alternatively, the services platform 109 and/or services 111 may perform any combination of the steps of the process 1300 in combination with the computer vision system 103 or as standalone components. Although the process 1300 is illustrated and described as a sequence of steps, it is contemplated that various embodiments of the process 1300 may be performed in any order or combination and need not include all of the illustrated steps.

The process 1300 provides an embodiment of the process 1200 of FIG. 12 in which multiple signs may be depicted in the input image. Accordingly, the process 1300 describes additional and optional steps that can be performed during, for instance, steps 1205 and 1207 of the process 1200 of FIG. 12.

In step 1301, in addition to encoding the angle and location of detected sign edges, the computer vision system 103 determines a predicted sign center for each respective grid cell in which at least one edge of the at least one sign is detected. In one embodiment, the predicted sign center represents the processing node's prediction of where in the input image (e.g., typically beyond the boundaries of the cell in which the current sign edge is detected) the center point of the sign corresponding to the detected edge lies. In one embodiment, a processing node can compute the prediction of the sign center independently using only the image data available in the cells for which it is responsible. Alternatively, the processing node can use a more connected layer of a neural network or a receive image data from a larger portion of the input image to predict the sign center.

In one embodiment, the computer vision system 103 includes a parameter indicating the predicted sign center in the cell-based parametric representation in addition to the other parameters previously described. In one embodiment, a parameter representing the predicted sign center is indicated as an X, Y displacement from said each respective grid cell to the predicted sign center. Accordingly, in embodiments in which a predicted sign center is computed, a parametric representation of edge can include the following parameters: <confidence>, <radius>, <angle>, <predicted sign center>, where <predicted sign center>=<X displacement from reference point of cell to predicted sign center, Y displacement from reference point of cell to predicted sign center>.

In step 1303, the computer vision system 103 clusters the cell-based parametric representation for said each respective grid cell in which the at least one edge of the at least one sign is detected into one or more clusters based on the predicted sign center for said each respective grid cell. In step 1305, the computer vision system 103 designates each of the one or more clusters as representative of a different sign when the input image depicts more than one sign. For example, given the parametric representation above, the computer vision system 103 can evaluate the predicted sign center parameter for each detected edge to determine which cluster the detected edge belongs. In other words, if a parametric representation predicts a sign center at approximately the same location (e.g., within clustering criteria based, for instance, on clustering methods such as mean shift, DBSCAN, and/or any other equivalent clustering algorithm), then the edges are likely edges of the same sign. Therefore, when an input image depicts multiple signs, even though edges are determined from the perspective of individual grid cells, the predicted sign center provides an estimate of the overall position of the sign within the entire image, thereby enabling the computer vision system 103 to advantageously distinguish to which signs individually detected edges are likely to belong.

Figure 14:
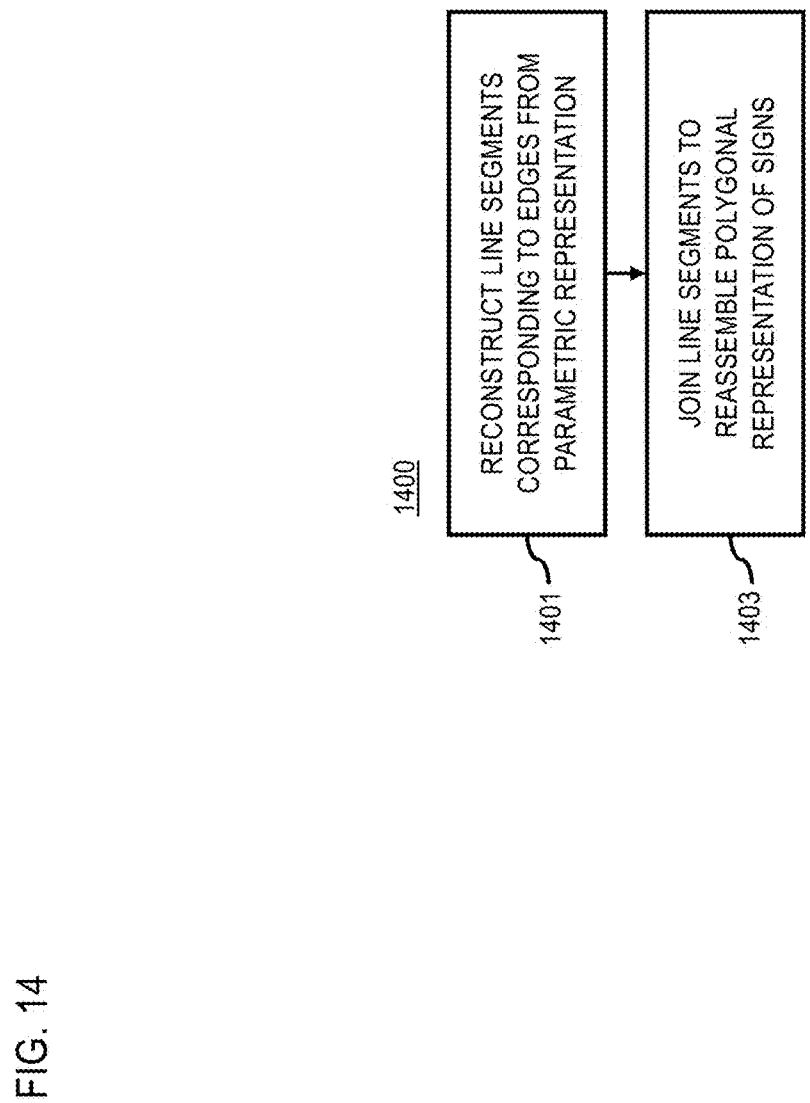
FIG. 14 is a flowchart for generating a polygonal representation of a sign from a parametric representation, according to one embodiment.
Figure 15:
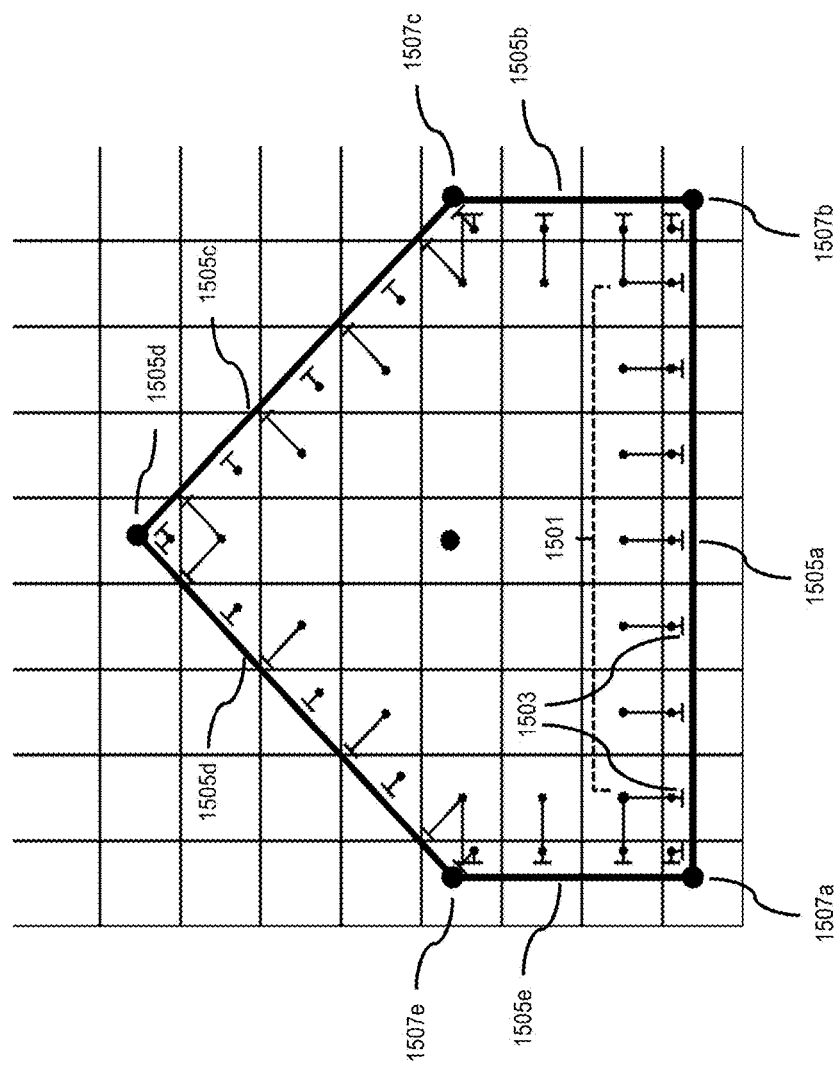
FIG. 15 is a diagram illustrating an example of generating a polygonal representation of a sign from a parametric representation, according to one embodiment.

FIG. 14 is a flowchart for generating a polygonal representation of a sign from a parametric representation, according to one embodiment. In one embodiment, the computer vision system 103 may perform one or more portions of the process 1400 and may be implemented in, for instance, a chip set including a processor and a memory as shown in FIG. 17. As such, the computer vision system 103 can provide means for accomplishing various parts of the process 1400. In addition or alternatively, the services platform 109 and/or services 111 may perform any combination of the steps of the process 1400 in combination with the computer vision system 103 or as standalone components. Although the process 1400 is illustrated and described as a sequence of steps, it is contemplated that various embodiments of the process 1400 may be performed in any order or combination and need not include all of the illustrated steps.

As noted above, in most cases, signs can also be represented as polygons using a function describing vertices of the polygons and line segments connecting those vertices. The parametric representations generated according to the various embodiments described above (e.g., in FIGS. 12 and 13), however, produce a representation that is grid-cell based. In other words, the parametric representation described herein segments the edges of a detected sign into individual line segments spanning each cell in which an edge is detected. Accordingly, this representation is not itself a polygon representation, but it is computationally inexpensive to convert this parametric representation into the more common polygonal representation. The process 1300 describes this conversion process and discuss with respect to the FIG. 15 which is a diagram illustrating an example of generating a polygonal representation of a sign from a parametric representation, according to one embodiment.

In step 1401, the computer vision system 103 processes the cell-based parametric representation for each respective cell in the parametric representation to reconstruct one or more line segments corresponding to the detected at least one edge cell. For example, the group of cells 1501 as shown in 1501 have parametric representations of detected edges that individually predict the location and angle of line segments 1503 corresponding to the detected edges. Please note that in FIG. 15, line segments 1503 are indicated for only two of the cells for illustration, but it is intended that each cell with a detected edge has such a line segment as shown.

In step 1401, the computer vision system 103 joins the line segments to reassemble a polygonal representation of the at least one sign. For example, each of the line segments 1503 are extended and connected between the cells to form respective lines 1505a-1505e. These lines are then joined at their intersection points to represent respective vertices 1507a-1507e of a polygonal representation of the detected sign.

The processes described herein for providing a parametric representation of signs may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 16:
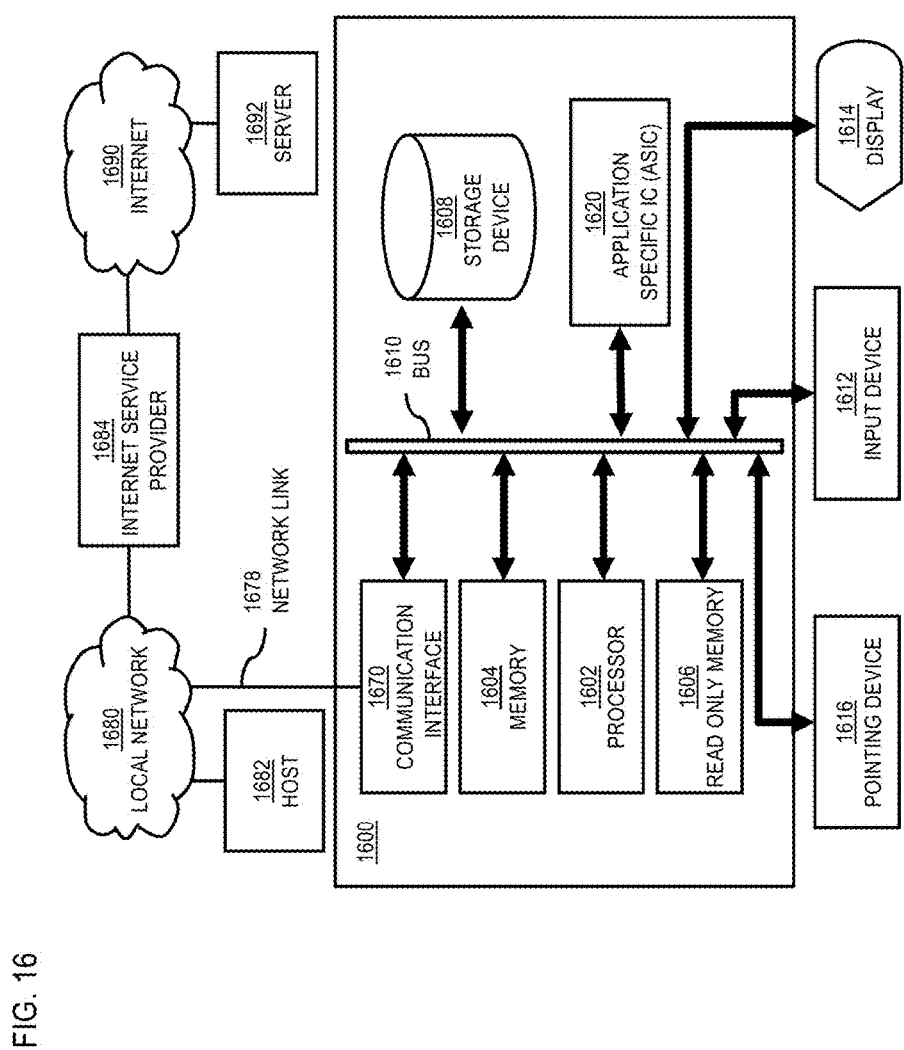
FIG. 16 is a diagram of hardware that can be used to implement an embodiment of the invention.

FIG. 16 illustrates a computer system 1600 upon which an embodiment of the invention may be implemented. Computer system 1600 is programmed (e.g., via computer program code or instructions) to provide a parametric representation of signs as described herein and includes a communication mechanism such as a bus 1610 for passing information between other internal and external components of the computer system 1600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1610 includes one or more parallel conductors of information so that information is transferred quickly among devices coupled to the bus 1610. One or more processors 1602 for processing information are coupled with the bus 1610.

A processor 1602 performs a set of operations on information as specified by computer program code related to providing a parametric representation of signs. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1610 and placing information on the bus 1610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1600 also includes a memory 1604 coupled to bus 1610. The memory 1604, such as a random access memory (RAM) or other dynamic storage device, stores information including processor instructions for providing a parametric representation of signs. Dynamic memory allows information stored therein to be changed by the computer system 1600. RAM allows a unit of information stored at a location called a memory address to be stored and retrieved independently of information at neighboring addresses. The memory 1604 is also used by the processor 1602 to store temporary values during execution of processor instructions. The computer system 1600 also includes a read only memory (ROM) 1606 or other static storage device coupled to the bus 1610 for storing static information, including instructions, that is not changed by the computer system 1600. Some memory is composed of volatile storage that loses the information stored thereon when power is lost. Also coupled to bus 1610 is a non-volatile (persistent) storage device 1608, such as a magnetic disk, optical disk or flash card, for storing information, including instructions, that persists even when the computer system 1600 is turned off or otherwise loses power.

Information, including instructions for providing a parametric representation of signs, is provided to the bus 1610 for use by the processor from an external input device 1612, such as a keyboard containing alphanumeric keys operated by a human user, or a sensor. A sensor detects conditions in its vicinity and transforms those detections into physical expression compatible with the measurable phenomenon used to represent information in computer system 1600. Other external devices coupled to bus 1610, used primarily for interacting with humans, include a display device 1614, such as a cathode ray tube (CRT) or a liquid crystal display (LCD), or plasma screen or printer for presenting text or images, and a pointing device 1616, such as a mouse or a trackball or cursor direction keys, or motion sensor, for controlling a position of a small cursor image presented on the display 1614 and issuing commands associated with graphical elements presented on the display 1614. In some embodiments, for example, in embodiments in which the computer system 1600 performs all functions automatically without human input, one or more of external input device 1612, display device 1614 and pointing device 1616 is omitted.

In the illustrated embodiment, special purpose hardware, such as an application specific integrated circuit (ASIC) 1620, is coupled to bus 1610. The special purpose hardware is configured to perform operations not performed by processor 1602 quickly enough for special purposes. Examples of application specific ICs include graphics accelerator cards for generating images for display 1614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1600 also includes one or more instances of a communications interface 1670 coupled to bus 1610. Communication interface 1670 provides a one-way or two-way communication coupling to a variety of external devices that operate with their own processors, such as printers, scanners and external disks. In general the coupling is with a network link 1678 that is connected to a local network 1680 to which a variety of external devices with their own processors are connected. For example, communication interface 1670 may be a parallel port or a serial port or a universal serial bus (USB) port on a personal computer. In some embodiments, communications interface 1670 is an integrated services digital network (ISDN) card or a digital subscriber line (DSL) card or a telephone modem that provides an information communication connection to a corresponding type of telephone line. In some embodiments, a communication interface 1670 is a cable modem that converts signals on bus 1610 into signals for a communication connection over a coaxial cable or into optical signals for a communication connection over a fiber optic cable. As another example, communications interface 1670 may be a local area network (LAN) card to provide a data communication connection to a compatible LAN, such as Ethernet. Wireless links may also be implemented. For wireless links, the communications interface 1670 sends or receives or both sends and receives electrical, acoustic or electromagnetic signals, including infrared and optical signals, that carry information streams, such as digital data. For example, in wireless handheld devices, such as mobile telephones like cell phones, the communications interface 1670 includes a radio band electromagnetic transmitter and receiver called a radio transceiver. In certain embodiments, the communications interface 1670 enables connection to the communication network 107 for providing a parametric representation of signs.

The term computer-readable medium is used herein to refer to any medium that participates in providing information to processor 1602, including instructions for execution. Such a medium may take many forms, including, but not limited to, non-volatile media, volatile media and transmission media. Non-volatile media include, for example, optical or magnetic disks, such as storage device 1608. Volatile media include, for example, dynamic memory 1604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 17 illustrates a chip set 1700 upon which an embodiment of the invention may be implemented. Chip set 1700 is programmed to provide a parametric representation of signs as described herein and includes, for instance, the processor and memory components described with respect to FIG. 16 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1700 includes a communication mechanism such as a bus 1701 for passing information among the components of the chip set 1700. A processor 1703 has connectivity to the bus 1701 to execute instructions and process information stored in, for example, a memory 1705. The processor 1703 may include one or more processing cores with each core configured to perform independently. A multi-core processor enables multiprocessing within a single physical package. Examples of a multi-core processor include two, four, eight, or greater numbers of processing cores. Alternatively or in addition, the processor 1703 may include one or more microprocessors configured in tandem via the bus 1701 to enable independent execution of instructions, pipelining, and multithreading. The processor 1703 may also be accompanied with one or more specialized components to perform certain processing functions and tasks such as one or more digital signal processors (DSP) 1707, or one or more application-specific integrated circuits (ASIC) 1709. A DSP 1707 typically is configured to process real-world signals (e.g., sound) in real time independently of the processor 1703. Similarly, an ASIC 1709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1703 and accompanying components have connectivity to the memory 1705 via the bus 1701. The memory 1705 includes both dynamic memory (e.g., RAM, magnetic disk, writable optical disk, etc.) and static memory (e.g., ROM, CD-ROM, etc.) for storing executable instructions that when executed perform the inventive steps described herein to provide a parametric representation of signs. The memory 1705 also stores the data associated with or generated by the execution of the inventive steps.

Figure 18:
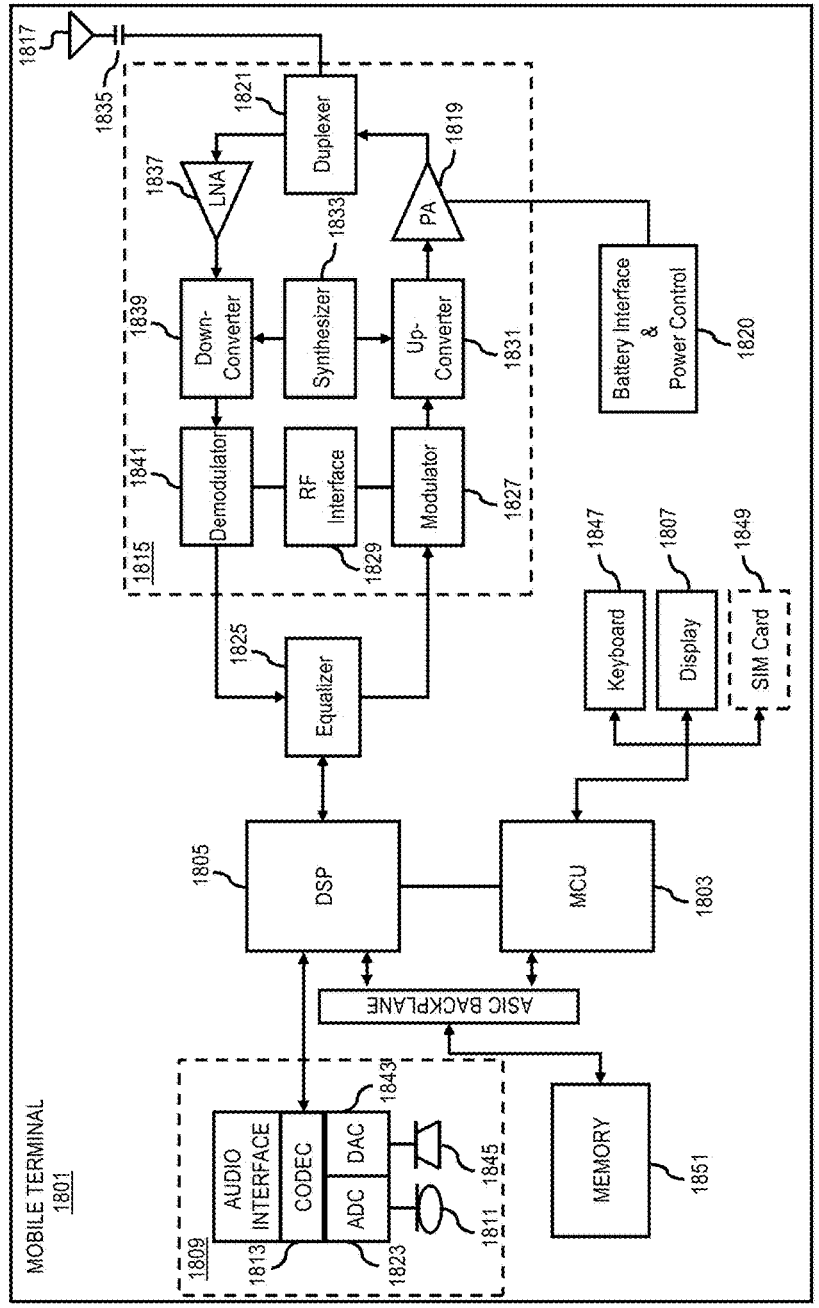
FIG. 18 is a diagram of a mobile terminal (e.g., handset) that can be used to implement an embodiment of the invention.

FIG. 18 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1803, a Digital Signal Processor (DSP) 1805, and a receiver/transmitter unit including a microphone gain control unit and a speaker gain control unit. A main display unit 1807 provides a display to the user in support of various applications and mobile station functions that offer automatic contact matching. An audio function circuitry 1809 includes a microphone 1811 and microphone amplifier that amplifies the speech signal output from the microphone 1811. The amplified speech signal output from the microphone 1811 is fed to a coder/decoder (CODEC) 1813.

A radio section 1815 amplifies power and converts frequency in order to communicate with a base station, which is included in a mobile communication system, via antenna 1817. The power amplifier (PA) 1819 and the transmitter/modulation circuitry are operationally responsive to the MCU 1803, with an output from the PA 1819 coupled to the duplexer 1821 or circulator or antenna switch, as known in the art. The PA 1819 also couples to a battery interface and power control unit 1820.

In use, a user of mobile station 1801 speaks into the microphone 1811 and his or her voice along with any detected background noise is converted into an analog voltage. The analog voltage is then converted into a digital signal through the Analog to Digital Converter (ADC) 1823. The control unit 1803 routes the digital signal into the DSP 1805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1825 for compensation of any frequency-dependent impairments that occur during transmission though the air such as phase and amplitude distortion. After equalizing the bit stream, the modulator 1827 combines the signal with a RF signal generated in the RF interface 1829. The modulator 1827 generates a sine wave by way of frequency or phase modulation. In order to prepare the signal for transmission, an up-converter 1831 combines the sine wave output from the modulator 1827 with another sine wave generated by a synthesizer 1833 to achieve the desired frequency of transmission. The signal is then sent through a PA 1819 to increase the signal to an appropriate power level. In practical systems, the PA 1819 acts as a variable gain amplifier whose gain is controlled by the DSP 1805 from information received from a network base station. The signal is then filtered within the duplexer 1821 and optionally sent to an antenna coupler 1835 to match impedances to provide maximum power transfer. Finally, the signal is transmitted via antenna 1817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1801 are received via antenna 1817 and immediately amplified by a low noise amplifier (LNA) 1837. A down-converter 1839 lowers the carrier frequency while the demodulator 1841 strips away the RF leaving only a digital bit stream. The signal then goes through the equalizer 1825 and is processed by the DSP 1805. A Digital to Analog Converter (DAC) 1843 converts the signal and the resulting output is transmitted to the user through the speaker 1845, all under control of a Main Control Unit (MCU) 1803—which can be implemented as a Central Processing Unit (CPU) (not shown).

The MCU 1803 receives various signals including input signals from the keyboard 1847. The keyboard 1847 and/or the MCU 1803 in combination with other user input components (e.g., the microphone 1811) comprise a user interface circuitry for managing user input. The MCU 1803 runs a user interface software to facilitate user control of at least some functions of the mobile station 1801 to provide a parametric representation of signs. The MCU 1803 also delivers a display command and a switch command to the display 1807 and to the speech output switching controller, respectively. Further, the MCU 1803 exchanges information with the DSP 1805 and can access an optionally incorporated SIM card 1849 and a memory 1851. In addition, the MCU 1803 executes various control functions required of the station. The DSP 1805 may, depending upon the implementation, perform any of a variety of conventional digital processing functions on the voice signals. Additionally, DSP 1805 determines the background noise level of the local environment from the signals detected by microphone 1811 and sets the gain of microphone 1811 to a level selected to compensate for the natural tendency of the user of the mobile station 1801.

The CODEC 1813 includes the ADC 1823 and DAC 1843. The memory 1851 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1851 may be, but not limited to, a single memory, CD, DVD, ROM, RAM, EEPROM, optical storage, or any other non-volatile or non-transitory storage medium capable of storing digital data.

An optionally incorporated SIM card 1849 carries, for instance, important information, such as the cellular phone number, the carrier supplying service, subscription details, and security information. The SIM card 1849 serves primarily to identify the mobile station 1801 on a radio network. The card 1849 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving, by a computer vision system, a request to detect and encode at least one sign depicted in an input image into a parametric representation of the at least one sign;
   assigning respective one or more processing nodes of the computer vision system to independently process each respective grid cell of the input image to detect at least one edge of the at least one sign, wherein said processing nodes are assigned based on a proximity to said each respective grid cell, and wherein said each respective grid cell is among a plurality of grid cells created by overlaying a grid onto the input image;
   encoding, by said respective processing nodes, an angle and a location of a detected at least one edge as edge parameters of a cell-based parametric representation for said each respective grid cell; and
   aggregating the cell-based parametric representation for said each respective grid cell in which the at least one edge of the at least one sign is detected to output the parametric representation of the at least one sign.

2. The method of claim 1, wherein there are more than one of said processing nodes assigned to process the respective grid cell to generate a plurality of redundant cell-based parametric representations for said each respective grid cell, and wherein the plurality of redundant cell-based parametric representations are processed into a single cell-based parametric representation to represent the cell-based parametric representation for said each respective grid cell.

3. The method of claim 1, further comprising:
   determining a confidence value associated with the detected at least one edge,
   wherein the confidence value is further encoded into the cell-based parametric representation.

4. The method of claim 1, further comprising:
   determining a reference point and a reference angle for said each respective grid cell;
   encoding the location of the detected at least one edge as a distance along a line segment drawn from the reference point to the detected at least one edge, wherein the line segment is perpendicular to the detected at least one edge; and
   encoding the angle of the detected at least one edge in relation to the reference angle.

5. The method of claim 4, wherein the reference point is a centroid of an area of said each respective grid cell that represents image data corresponding to the at least one sign.

6. The method of claim 4, wherein the cell-based parametric representation includes a plurality of output channels, and wherein each of the plurality of output channels corresponds to an edge detector that is responsible for a different range of edge angles.

7. The method of claim 1, further comprising:
   determining a predicted sign center for said each respective grid cell in which the at least one edge of the at least one sign is detected,
   wherein the cell-based parametric representation further includes a parameter indicating the predicted sign center.

8. The method of claim 7, further comprising:
clustering the cell-based parametric representation for said each respective grid cell in which the at least one edge of the at least one sign is detected into one or more clusters based on the predicted sign center for said each respective grid cell; and
designating each of the one or more clusters as representative of a different sign when the input image depicts more than one sign.

9. The method of claim 7, wherein a parameter representing the predicted sign center is indicated as an X, Y displacement from said each respective grid cell to the predicted sign center.

10. The method of claim 1, further comprising:
processing the cell-based parametric representation for said each respective cell in the parametric representation to reconstruct one or more line segments corresponding to the detected at least one edge cell; and
joining the line segments to reassemble a polygonal representation of the at least one sign.

11. The method of claim 1, wherein cell-based parametric representation further includes an attribute parameter, and wherein the attribute parameter indicates one or more characteristics of the detected at least one edge, the at least one sign, or a combination thereof.

12. An apparatus comprising:
at least one processor; and
at least one memory including computer program code for one or more programs,
the at least one memory and the computer program code configured to, with the at least one processor, cause the apparatus to perform at least the following,
receive, by a computer vision system, a request to detect and encode at least one sign depicted in an input image into a parametric representation of the at least one sign;
assign respective one or more processing nodes of the computer vision system to independently process each respective grid cell of the input image to detect at least one edge of the at least one sign, wherein said processing nodes are assigned based on a proximity to said each respective grid cell, and wherein said each respective grid cell is among a plurality of grid cells created by overlaying a grid onto the input image;
encode, by said respective processing nodes, an angle and a location of a detected at least one edge as edge parameters of a cell-based parametric representation for said each respective grid cell; and
aggregate the cell-based parametric representation for said each respective grid cell in which the at least one edge of the at least one sign is detected to output the parametric representation of the at least one sign.

13. The apparatus of claim 12, wherein there are more than one of said processing nodes assigned to process the respective grid cell to generate a plurality of redundant cell-based parametric representations for said each respective grid cell, and wherein the plurality of redundant cell-based parametric representations are processed into a single cell-based parametric representation to represent the cell-based parametric representation for said each respective grid cell.

14. The apparatus of claim 12, wherein the apparatus is further caused to:
determine a confidence value associated with the detected at least one edge,
wherein the confidence value is further encoded into the cell-based parametric representation.

15. The apparatus of claim 12, wherein the apparatus is further caused to:
determine a reference point and a reference angle for said each respective grid cell;
encode the location of the detected at least one edge as a distance along a line segment drawn from the reference point to the detected at least one edge, wherein the line segment is perpendicular to the detected at least one edge; and
encode the angle of the detected at least one edge in relation to the reference angle.

16. The apparatus of claim 12, wherein the apparatus is further caused to:
determine a predicted sign center for said each respective grid cell in which the at least one edge of the at least one sign is detected,
wherein the cell-based parametric representation further includes a parameter indicating the predicted sign center.

17. A non-transitory computer-readable storage medium, carrying one or more sequences of one or more instructions which, when executed by one or more processors, cause an apparatus to perform:
receiving, by a computer vision system, a request to detect and encode at least one sign depicted in an input image into a parametric representation of the at least one sign;
assigning respective one or more processing nodes of the computer vision system to independently process each respective grid cell of the input image to detect at least one edge of the at least one sign, wherein said processing nodes are assigned based on a proximity to said each respective grid cell, and wherein said each respective grid cell is among a plurality of grid cells created by overlaying a grid onto the input image;
encoding, by said respective processing nodes, an angle and a location of a detected at least one edge as edge parameters of a cell-based parametric representation for said each respective grid cell; and
aggregating the cell-based parametric representation for said each respective grid cell in which the at least one edge of the at least one sign is detected to output the parametric representation of the at least one sign.

18. The non-transitory computer-readable storage medium of claim 17, wherein there are more than one of said processing nodes assigned to process the respective grid cell to generate a plurality of redundant cell-based parametric representations for said each respective grid cell, and wherein the plurality of redundant cell-based parametric representations are processed into a single cell-based parametric representation to represent the cell-based parametric representation for said each respective grid cell.

19. The non-transitory computer-readable storage medium of claim 17, wherein the apparatus is further caused to perform:
determining a confidence value associated with the detected at least one edge,
wherein the confidence value is further encoded into the cell-based parametric representation.

20. The non-transitory computer-readable storage medium of claim 17, wherein the apparatus is further caused to perform:
determining a reference point and a reference angle for said each respective grid cell;
encoding the location of the detected at least one edge as a distance along a line segment drawn from the reference point to the detected at least one edge, wherein the line segment is perpendicular to the detected at least one edge; and encoding the angle of the detected at least one edge in relation to the reference angle.

\* \* \* \* \*